United States Patent
Teo et al.

(10) Patent No.: US 6,996,418 B2
(45) Date of Patent: Feb. 7, 2006

(54) APPARATUS AND METHOD FOR OFDM DATA COMMUNICATIONS

(75) Inventors: Koon Hoo Teo, Nepean (CA); David G. Steer, Nepean (CA); Chris Ward, Bishops Stortford (GB)

(73) Assignee: Nortel Networks Limited, St. Laurent (CA)

( * ) Notice: Subject to any disclaimer, the term of this patent is extended or adjusted under 35 U.S.C. 154(b) by 703 days.

(21) Appl. No.: 09/842,128

(22) Filed: Apr. 26, 2001

(65) Prior Publication Data

US 2002/0086708 A1 Jul. 4, 2002

Related U.S. Application Data

(60) Provisional application No. 60/258,558, filed on Dec. 29, 2000.

(51) Int. Cl.
*H04B 1/38* (2006.01)

(52) U.S. Cl. ............... 455/562.1; 455/561; 455/452.1; 455/450; 370/208; 370/210; 375/260; 342/457; 343/702; 343/853

(58) Field of Classification Search ............ 455/562.1, 455/561, 452.1, 434, 450; 370/206, 208, 370/478, 203; 342/367–368, 457; 343/702, 343/853; 375/260
See application file for complete search history.

(56) References Cited

U.S. PATENT DOCUMENTS

| 5,615,409 A | * | 3/1997 | Forssen et al. | 455/440 |
|---|---|---|---|---|
| 5,726,978 A | | 3/1998 | Frodigh et al. | 370/252 |
| 5,907,816 A | * | 5/1999 | Newman et al. | 455/562.1 |
| 5,933,421 A | | 8/1999 | Alamouti et al. | 370/330 |
| 5,966,670 A | * | 10/1999 | Keskitalo et al. | 455/562.1 |
| 6,091,788 A | | 7/2000 | Keskitalo et al. | 375/347 |
| 6,131,016 A | * | 10/2000 | Greenstein et al. | 455/69 |
| 6,330,459 B1 | * | 12/2001 | Crichton et al. | 455/562.1 |
| 6,370,369 B1 | * | 4/2002 | Kraiem et al. | 455/277.1 |

(Continued)

FOREIGN PATENT DOCUMENTS

EP 1047209 4/2000

*Primary Examiner*—William Trost
*Assistant Examiner*—Sharad Rampuria

(57) ABSTRACT

A radio system employing Orthogonal Frequency Division Multiplexed (OFDM) includes a Base Transceiver Station (BTS) along with a number of mobile terminals located within a coverage area of the BTS. In this system, a target mobile terminal is provided with a focused transmission beam to receive high data rate traffic information while the remainder of the mobile terminals are provide with pilot and signalling information. To achieve both objectives, a BTS is implemented with a transmission apparatus that generates a directional transmission beam for the data traffic information. In one design, this directional beam transmits the pilot and signalling information along with the data traffic information by rotating the beam within the coverage area. In another design, the BTS has a transmission apparatus that generates more than one transmission beam. In one case, the BTS transmits a directional transmission beam for the data traffic information required by the target mobile terminal and a second broad transmission beam for the pilot and signalling information required by the all of the mobile terminals. In another case, the BTS transmits two directional transmissions beams, one beam for data traffic information and one rotating beam for pilot and signalling information.

43 Claims, 15 Drawing Sheets

U.S. PATENT DOCUMENTS

| | | | |
|---|---|---|---|
| 6,397,082 B1 * | 5/2002 | Searle | 455/562.1 |
| 6,415,163 B1 * | 7/2002 | Keskitalo et al. | 455/562.1 |
| 6,512,797 B1 * | 1/2003 | Tellado et al. | 375/261 |
| 6,597,927 B1 * | 7/2003 | Eswara et al. | 370/334 |
| 6,678,527 B1 * | 1/2004 | Rasanen | 455/450 |
| 6,771,987 B1 * | 8/2004 | Dam et al. | 455/562.1 |
| 2003/0195017 A1 * | 10/2003 | Chen et al. | 455/562.1 |
| 2004/0067775 A1 * | 4/2004 | Dalal et al. | 455/562.1 |

* cited by examiner

APPARATUS AND METHOD FOR OFDM DATA COMMUNICATIONS

CROSS-REFERENCE TO RELATED APPLICATION

This application claims the benefit of U.S. Provisional Application No. 60/258,558, filed Dec. 29, 2000.

FIELD OF THE INVENTION

This invention relates generally to radio data communications and, in particular, to apparatus and methods for Orthogonal Frequency Division Multiplexed (OFDM) data communications.

BACKGROUND OF THE INVENTION

In an OFDM system, a Radio Frequency (RF) channel (or bearer) that is transmitted from a Base Transceiver Station (BTS) to one or more mobile terminals is subdivided into a plurality of data traffic carriers with overlapping spectrum along with various pilot and common signalling carriers that are distributed across the RF channel. The pilot carriers within an RF channel are utilized to broadcast pilot information, which is generally referred to as a pilot channel, from a Base Transceiver Station (BTS) to one or more mobile terminals, this pilot channel being used by the mobile terminals for frequency reference, carrier recovery and channel estimates. The signalling carriers within an RF channel are utilized to communicate signalling information (such as control messages), which is generally referred to as signalling channels, from the BTS to mobile terminals. The data traffic carriers within an RF channel are utilized to communicate data traffic information, generally referred to as data traffic channels, from the BTS to mobile terminals.

In an OFDM system, there is a need for the pilot information and signalling messages to be consistently transmitted to all mobile terminals in a particular coverage area. In a well-known implementation, the pilot, signalling and data traffic channels for a given RF channel share the same antenna beam which is transmitted to an entire coverage area from the BTS, the coverage area generally being a single sector within a sectorized wireless network. In this implementation, a sector omni-directional antenna is used that allows the pilot, signalling, and data traffic channels to reach each mobile terminal within the coverage area simultaneously. The coverage area may be the full 360 degree cell area around the BTS or the coverage area may be a sector of the 360 degrees. Commonly the cells are tri-sectored with each sector being 120 degrees. The sector omni-directional antenna thus is designed to provide coverage throughout the sector and a number of sector antennas are arranged for full coverage of the cell. The pilot and signalling channels are utilized by all of the mobile terminals within the coverage area while the data traffic channels are processed only by the mobile terminal(s) that the data traffic was targeted for, these mobile terminal(s) being referred hereinafter as the target mobile terminals.

One problem with this implementation is the limited power (or link gain) that a sector omni-directional broadcast is capable of while reaching all of the mobile terminals within the coverage area simultaneously. At the high bit rates that the data traffic is typically transmitted at, the power to transmit the RF channel to the target mobile terminal(s) with a sector omni-directional broadcast would be relatively expensive and possibly impractical. This is especially true, in cases where physical barriers such as walls and buildings are between the BTS and the target mobile terminal(s). The use of a sector omni-directional broadcast further introduces the possibility of interference into adjacent cells or sectors, this interference increasing as the power of the transmission increases.

Hence, modified transmission techniques are required that allow for sufficient signal power such that the BTS can reach any target mobile terminal within its coverage area. Preferably, this modified transmission technique would also reduce the interference introduced into adjacent cells or sectors.

SUMMARY OF THE INVENTION

The present invention is directed to apparatus and method for OFDM data communications. In the present invention, a BTS utilizes a directional beam to transmit data traffic channels to target mobile terminal(s). In one embodiment, the directional beam contains the entire RF channel and rotates through the coverage area such that each mobile terminal within the coverage area can have access to the pilot and signalling channels while the target mobile terminal(s) can have access to the entire RF channel. In other embodiments of the present invention, the RF channel is divided into at least two beams, at least one beam transmitting the data traffic channels, hereinafter referred to as the data traffic information, and at least one beam transmitting the pilot and signalling channels, hereinafter referred to as the service information. This service information may also include other kinds of information that is meant to be broadcast to all mobile terminals within the coverage area. The beam transmitting the data traffic information is a directional beam to ensure sufficient power is directed at the target mobile terminal(s) while the beam transmitting the service information can either be a sector omni-directional beam or a rotating directional beam.

The data traffic information may also include pilot carriers for the purpose of channel estimation, synchronization and/or frequency reference. It should be noted that when data traffic information is referred hereinafter, it implies that it may include the pilot channels. If multiple beams are carrying the pilot channels using the same frequency carriers and covering the same target mobile terminal, then techniques such as coding may be used to differentiate the pilot carriers belonging to the different beams.

The directional beam may be directed towards the target mobile terminal(s) by means of the mobile terminal(s) known location in the case of fixed terminals. Alternatively, each of the target mobile terminal(s) could have locating equipment that allows it to report its location to the BTS or could be located with the use of feedback information signalling sent from each of the target mobile terminal(s) to the BTS which is used by the BTS to direct the directional beam.

The present invention, according to a first broad aspect, is an OFDM BTS arranged to communicate with a plurality of mobile terminals within a coverage area including at least one target mobile terminal. In this aspect, the BTS includes a processing apparatus and a transmission apparatus. The processing apparatus operates to receive and process service and data traffic information. The transmission apparatus operates to receive the processed service and data traffic information, to transmit the processed service information on a first set of carriers to the mobile terminals within the coverage area with a first transmission beam and to transmit the processed data traffic information on a second set of carriers to the target mobile terminal with a second transmission beam. In this aspect, the second transmission beam is a directional transmission beam.

In one embodiment, the first transmission beam is sufficiently broad for each of the mobile terminals within the coverage area to receive the processed service information. In another embodiment, the first transmission beam is a directional transmission beam. In this case, the BTS is operable to modify the direction of focus of the directional first transmission beam in order for each of the mobile terminals within the coverage area to receive the processed service information.

In cases of directional beams being utilized, a number of embodiments of transmission apparatus are possible. In one implementation, the transmission apparatus includes a number of output paths, each of the output paths consisting of a phase adjuster coupled to the processing apparatus and further coupled in series with a transmitter and an antenna. In this case, the output paths each receive the required processed information from the processing apparatus and operate together to generate the directional beam by selectively adjusting their respective phase adjusters. In another embodiment, the transmission apparatus includes a switch coupled to the processing apparatus and a number of output paths coupled to the switch, each of the output paths consisting of a transmitter coupled to the switch and a directional antenna coupled to its corresponding transmitter. In this case, the switch receives the processed information from the processing apparatus and selectively forwards the processed information to a set of the output paths to generate the directional beam. In yet another embodiment, the transmission apparatus includes a single transmitter coupled to the processing apparatus, a switch coupled to the transmitter and a plurality of directional antennas coupled to the switch. In this case, the transmitter receives the processed information from the processing apparatus and processes this information in order to prep it for transmission. The switch then selectively forwards the output from the transmitter to a set of the antennas to generate the directional beam.

In a second broad aspect, the present invention is an OFDM BTS similar to that of the first broad aspect but with a modified transmission apparatus. In this aspect, the transmission apparatus operates to receive the processed service and data traffic information, to transmit the processed service information on a first set of carriers and the processed data traffic information on a second set of carriers using a directional transmission beam. In this case, the BTS is operable to modify the direction of focus of the directional transmission beam in order for each of the mobile terminals within the coverage area to receive the processed service information.

In a third broad aspect, the present invention is a Base Transceiver Station (BTS) arranged to communicate with a plurality of mobile terminals within a coverage area. In this aspect, the BTS includes means for receiving service and data traffic information, means for transmitting the service information on a first set of carriers to the mobile terminals within the coverage area and means for transmitting the data traffic information with high link gain on a second set of carriers to the target mobile terminal.

In further aspects of the present invention are methods of transmitting service and data traffic information to a plurality of mobile terminals within a coverage area, at least one of the mobile terminals being a target mobile terminal. In one aspect, the method includes receiving service and data traffic information, transmitting the service information on a first set of carriers to the mobile terminals within the coverage area with a first transmission beam and transmitting the data traffic information on a second set of carriers to the target mobile terminal with a second transmission beam, the second transmission beam being a directional transmission beam. In another aspect, the method includes receiving service and data traffic information, transmitting the service information on a first set of carriers to the mobile terminals within the coverage area with a directional transmission beam and transmitting the data traffic information on a second set of carriers to the target mobile terminal with the directional transmission beam. In this aspect, the method further includes modifying the direction of focus of the directional transmission beam in order for each of the mobile terminals within the coverage area to receive the processed service information.

In yet another aspect, the present invention is a system including a Base Transceiver Station (BTS) according to one of the first and second aspects and a plurality of mobile terminals within a coverage area of the BTS. In this case, at least one of the mobile terminals is a target mobile terminal.

In an even further aspect, the present invention is a mobile terminal arranged to communicate with a BTS. In this aspect, the mobile terminal includes a radio reception apparatus and a monitor apparatus coupled to the radio reception apparatus. The radio reception apparatus operates to receive and process service information on a first set of carriers from at least one first transmission beam and to receive and process data traffic information on a second set of carriers from at least one second transmission beam. The monitor apparatus operates to determine if one or more of service information and data traffic information has been received at the radio reception apparatus. If only service information has been received, the monitor apparatus operates to instruct the BTS to attend to the received service information. If only data traffic information has been received, the monitor apparatus operates to instruct the BTS to attend to the received data traffic information. And if service and data traffic information has been received, the monitor apparatus operates to instruct the BTS to attend to both the received service and data traffic information.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention are described with reference to the following figures, in which.

DETAILED DESCRIPTION OF THE PREFERRED EMBODIMENT

Embodiments of the present invention are directed to apparatus and methods for Orthogonal Frequency Division Multiplexed (OFDM) radio data communications. In these embodiments of the present invention, at least one directional beam, as will be described herein below, is utilized to ensure data traffic channels being directed at a target mobile terminal have sufficient power. As described below, there are numerous possible implementations for OFDM radio systems utilizing at least one directional beam for the data traffic channels.

Within the embodiments of the present invention described below, the coverage areas for particular BTS comprise individual sectors, though this should not limit the scope of the present invention. For high frequency reuse, a wireless cell can be divided into n sectors, n commonly being three within many current wireless implementations. Within a sectorized system, each sector is operationally treated as a different cell. It should be understood that in alternative embodiments, the present invention could be implemented within a coverage area other than an individual sector, such as an entire cell or another region of space.

Directional wireless beams, using multiple antennas which are sometimes referred to as smart antennas, have been utilized previously within wireless systems. Smart antenna technology includes intelligent antennas, phased arrays, Spatial Division Multiplex Access (SPMA) arrays, digital beam forming arrays, adaptive antenna systems and switched beam antennas. In general, smart antenna technology can be categorized into two main groups: switched beam and adaptive array technologies. Switched beam antenna systems form multiple fixed beams with enhanced sensitivity in certain directions. This antenna system in operation switches from one beam to another as needed to move the directional beam to the currently necessary direction. Adaptive antenna technology, on the other hand, uses signal processing capabilities to locate and track various types of signals in order to dynamically direct a beam towards the mobile terminal to minimize interference and maximize intended signal reception.

Figure 1:
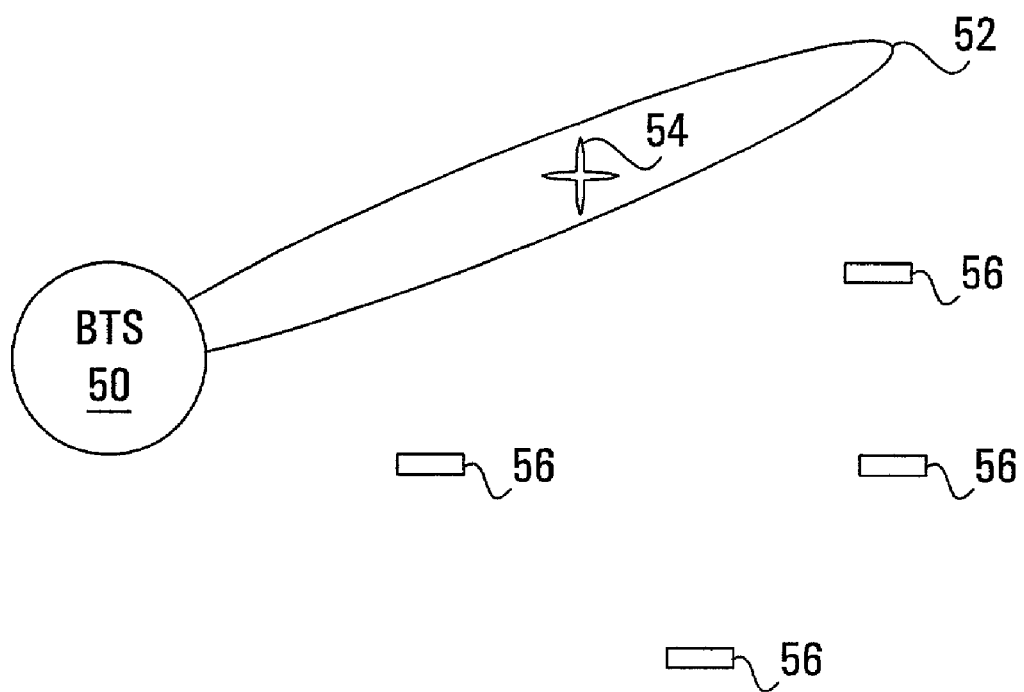
FIG. 1 is a block diagram illustrating a radio system using OFDM with a rotating directional beam.

In a first embodiment of the present invention, as illustrated in FIG. 1, a BTS 50 utilizes a directional wireless beam 52 to transmit data traffic channels to a target mobile terminal 54. Data traffic information (within the data traffic channels), as stated above, may include pilot signal information which may be used for channel estimation. The use of a directional beam system allows sufficient link gain to transmit the data traffic channels within the RF channel to the target mobile terminal 54 by steering energy towards the terminal 54 and thus, improving radio link performance. The use of this directional wireless beam achieves the needed power gain to the target mobile terminal 54 as well as reducing interference due to reuse of the same RF channel in neighbouring cells (or even within the same cell). Directing the energy in this way results in other mobile terminals 56 outside of the beam 52 to receive no or very limited amounts of the transmitted signals within the RF channel. Thus, the mobile terminals 56 outside of the beam 52 cannot receive any broadcast pilot information or signalling messages within the pilot and signalling channels.

To allow for the directional beam 52 to be used to transmit data traffic channels to the target mobile terminal 54 while still allowing pilot and signalling channels to be transmitted to all of the other mobile terminals 56 within the coverage area, a time division approach is implemented in the first implementation illustrated in FIG. 1. In this implementation, the BTS 50 transmits the directional wireless beam 52 in a rotating fashion, hereinafter referred to as a rotating beam, for the RF channel. In this implementation, each mobile terminal 54, 56 is scheduled to be within the directional beam 52 for a respective time interval. During the time interval in which the directional beam 52 is directed at the target mobile terminal 54, pilot and signalling channels can be received at the terminal 54 along with the data traffic channels. During each of the other time intervals during which the beam is directed towards the other mobile terminals 56, pilot and signalling channels can be received at the corresponding terminals. The determination of these transmission time intervals depends upon the data transfer rate required by the target mobile terminal 54 and the acceptable time delays between receiving pilot and signalling channel information at the other mobile terminals 56. Hence, the setting of the time intervals is an implementation detail which can be adjusted depending upon the situation. In one alternative, rather than assigning mobile terminals respective time intervals, the rotating beam simply sweeps through the coverage area of the BTS 50 at a rate that enables each mobile terminal to receive signalling and pilot channel bursts within the time the beam is passing the particular mobile terminal. In another alternative, several of these beams may be active within a sector. In this case, where the data traffic information also includes the pilot signal and the pilot signal occupies the same frequency set as the pilot signal of another beam, then techniques such as coding may be used at the transmit end and matched filtering at the receive end to differentiate the two pilot signals belonging to the two beams.

Figure 2A:
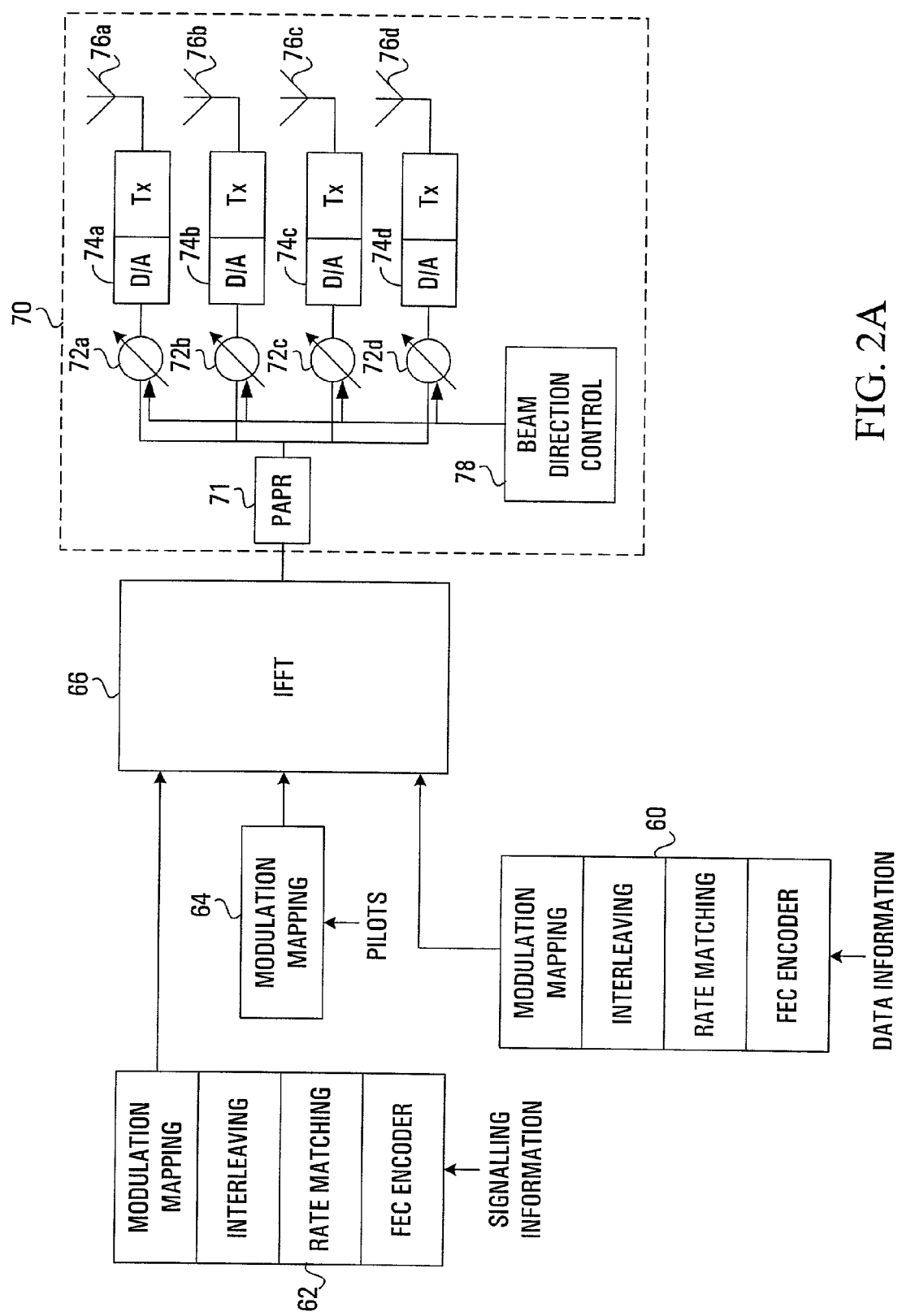
FIGS. 2A and 2B are block diagrams illustrating first and second implementations of the BTS of FIG. 1.
Figure 2B:
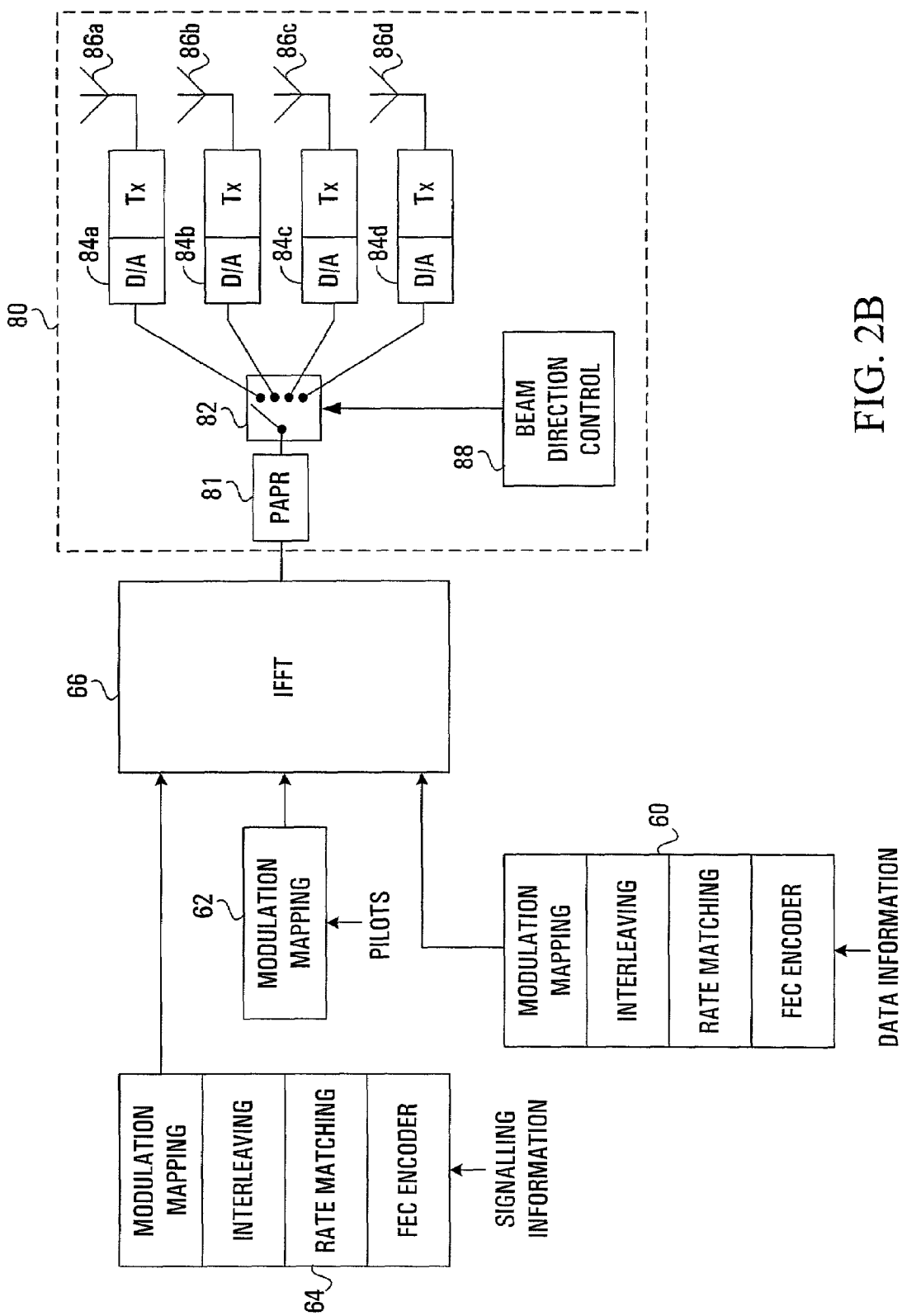

FIGS. 2A and 2B illustrate two possible implementations for the BTS 50 of the first embodiment of the present invention described above with reference to FIG. 1. In both the implementations of FIGS. 2A and 2B, the BTS 50 comprises a data information processor 60, a signalling information processor 62, a pilot processor 64, an Inverse Fast Fourier Transform (IFFT) block 66 coupled to each of the processors 60, 62, 64 and an output block coupled to the IFFT block 66. These components function together to process and transmit the data, signalling and pilot channels to the appropriate mobile terminals 54, 56. The difference between these implementations is the design of the output block and therefore, the manner in which the directional beam is generated. It is noted that there are other designs possible to generate a similar directional beam.

In both FIGS. 2A and 2B, the data information processor 60 is input with data information and performs numerous well-known processing functions on the received data information; these well-known processing functions including Forward Error Correction (FEC) encoding, rate matching, interleaving and modulation mapping. Although all of these functions are shown in a particular order in FIGS. 2A and 2B, one skilled in the art would understand that these functions could be performed in a different order with a similar resulting output. Further, in alternative embodiments, not all of the functions illustrated, such as FEC encoding, are performed by the processor 60 and/or additional functions not described are also performed. It is noted that the data information being input to the data information processor 60 could be in a number of different formats such as an Internet Protocol (IP) packet format, Motion Picture Experts Group (MPEG) coded images, video or another standard data unit format.

The signalling information processor 62 is input with signalling information that needs to be transmitted to one or more of the mobile terminals within the coverage area. This processor 62 performs well-known processing functions similar to the data information processor 60. These well-known processing functions in FIGS. 2A and 2B include FEC encoding, rate matching, interleaving and modulation mapping. It should be understood, similar to that described above for the data information processor 60, that the signalling information processor 62 could perform the functions in a different order than illustrated in FIGS. 2A and 2B, might not perform all of these functions and/or could perform additional functions not described.

The pilot processor 64, as illustrated in FIGS. 2A and 2B, is primarily used to perform modulation mapping on pilot signals that are input to the processor 64. Although not shown, it should be understood that the pilot processor 64 could perform additional functions not described.

Although illustrated and described as three separate and distinct processors 60, 62, 64, it should be understood that the common algorithms performed within these processors could be shared. Further, these processors 60, 62, 64 could be implemented within a single component or within a plurality of separate components.

The IFFT block 66, illustrated within FIGS. 2A and 2B, operates to transform the frequency-based data, signalling and pilot signals received from the data information processor 60, signalling information processor 62 and the pilot processor 64 respectively into a time-based output. This time-based output combines a data sub-carrier time sequence, a signalling sub-carrier time sequence and a pilot sub-carrier time sequence which is forwarded to the output block.

For the implementation illustrated within FIG. 2A, the BTS 50 includes an output block 70 that comprises a Peak to Average Power Ratio (PAPR) block 71 coupled to the IFFT block 66 and further coupled to a plurality of parallel output paths; the PAPR block 71 reducing the peak to average power ratio of the signals forwarded to the output paths. Each of the output paths comprises a respective phase adjuster 72a, 72b, 72c, 72d coupled to the PAPR block 71 and further coupled in series with a respective outputting apparatus 74a, 74b, 74c, 74d and a respective antenna 76a, 76b, 76c, 76d; the antennas providing sector coverage. In this implementation, the phase by which each of the phase adjusters 72a, 72b, 72c, 72d adjusts the sub-carrier time sequences dictates the particular direction the array of antennas' transmits the strongest energy. Hence, to generate the rotating directional beam as described above for the first implementation of FIG. 1, the phase adjusters 72a, 72b, 72c, 72d are adjusted systematically such that the transmission energy is directed to each mobile terminal within the coverage area for the proper time period.

In order to control the phase adjusters 72a, 72b, 72c, 72d, the output block 70 further comprises a beam direction control block 78, coupled to each of the phase adjusters, that is preferably implemented within an existing processor of the BTS 50. Alternatively, the beam direction control block 78 could be implemented within a separate processor or in hard logic devices. The beam direction control block 78 calculates the necessary phase adjustments to direct the beam as required. In the case of a BTS 50 that generates a rotating directional beam as illustrated in FIG. 2A, the block 78 continuously adjusts the phases of the different output paths so that the resulting directional beam sweeps through the sector at the appropriate rate. In order to properly direct the directional beam, the beam direction control block 78 preferably is aware of the location of the mobile terminal(s) within the coverage area; the block 78 determining the location of the mobile terminal(s) within its coverage area via a number of possible techniques. For one, in the case of fixed terminals, the block 78 could have the locations of the terminals within its coverage area predefined. Further, the mobile terminal(s) could report their location to the BTS 50 with the use of an on-board Global Positioning Satellite (GPS) apparatus (or similar location identifying apparatus). Yet further, the processing of signals received from the mobile terminal(s) at the BTS 50 could allow the block 78 to identify the location (or direction) of the mobile terminal(s); for example with the analysis of the angle of arrival of the mobile terminals' signals. In any of these cases, the determination of the location of the mobile terminal(s) within the coverage area allows the beam direction control block 78 to set the phases of the phase adjusters 72a, 72b, 72c, 72d to point the beam in the desired direction.

As illustrated in FIG. 2A, the outputting apparatus 74a, 74b, 74c, 74d each comprise a Digital-to-Analog (D/A) converter and a transmitter coupled in series between their respective phase adjusters 72a, 72b, 72c, 72d and their respective antennas 76a, 76b, 76c, 76d. The implementation and operation of these components within the outputting apparatus would be well-known by one skilled in the art.

For the implementation illustrated in FIG. 2B, the BTS 50 includes an output block 80 that comprises a PAPR block 81 coupled to the IFFT block 66 and further coupled to a switch 82 and a plurality of output paths coupled to the switch 82. The PAPR block 71 operates in a similar manner to the PAPR block 61 described above. Each of the output paths comprises a respective outputting apparatus 84a, 84b, 84c, 84d coupled to the switch 82 and further coupled in series with a respective directional antenna 86a, 86b, 86c, 86d. In this implementation, each of the directional antennas 86a, 86b, 86c, 86d have a different principle direction for the strongest energy to be transmitted. Hence, to generate the rotating directional beam, as described above for the first embodiment of the present invention, the switch 82 systematically switches the pilot, signalling and data sub-carrier time sequences to different outputting paths such that each mobile terminal within the coverage area is being transmitted to during the proper time period. As illustrated in FIG. 2B, the outputting apparatus 84a, 84b, 84c, 84d are identical to that described within the output block 70 illustrated within FIG. 2A.

Similar to FIG. 2A, the implementation of the BTS 50 of FIG. 2B further comprises a beam direction control block 88 that is coupled to the switch 82. In this case, the beam direction control block operates to control the switch 82 such that an appropriate directional antenna 86a, 86b, 86c, 86d is selected. Although not illustrated in all figures showing implementations for the BTS 50 depicted herein below, it should be understood that at least one beam direction control block similar to block 78 or block 88 would be implemented within each of the implementations requiring one or more directional beams as described herein below.

There are alternatives to the implementation of FIG. 2B. For instance, the switch 82 could be moved to reduce the need for multiple outputting apparatus 84a, 84b, 84c, 84d. In this alternative, the PAPR block 81 could be implemented in series with a single outputting apparatus and the switch 82, the switch 82 being coupled to each of the directional antenna 86a, 86b, 86c, 86d. This arrangement operates in a similar manner as the implementation of FIG. 2B, but can reduce costs by reducing the need for additional D/A converters and transmitters. The problem with this alternative is that the switch 82 must be capable of handling high RF powers since it is located after the amplification stage within the transmitter.

Although there are four parallel output paths with an antenna array of four within both the output block 70 of FIG. 2A and the output block 80 within FIG. 2B, it should be recognized that other alternatives are possible. In particular, it should be understood that additional antennas could be included within the array, each additional antenna having yet another parallel output path. If the output block implementation of FIG. 2A had greater than four output paths with corresponding antennas, an increasingly focussed directional beam could be possible. If the output block implementation of FIG. 2B had greater than four output paths with corresponding antennas, each antenna could be designed to focus on a smaller slice of the overall coverage area, hence allowing for higher link gain. Similarly, it should be recognized that it is possible to implement the first implementation with less than four output paths with corresponding antennas.

Figure 3:
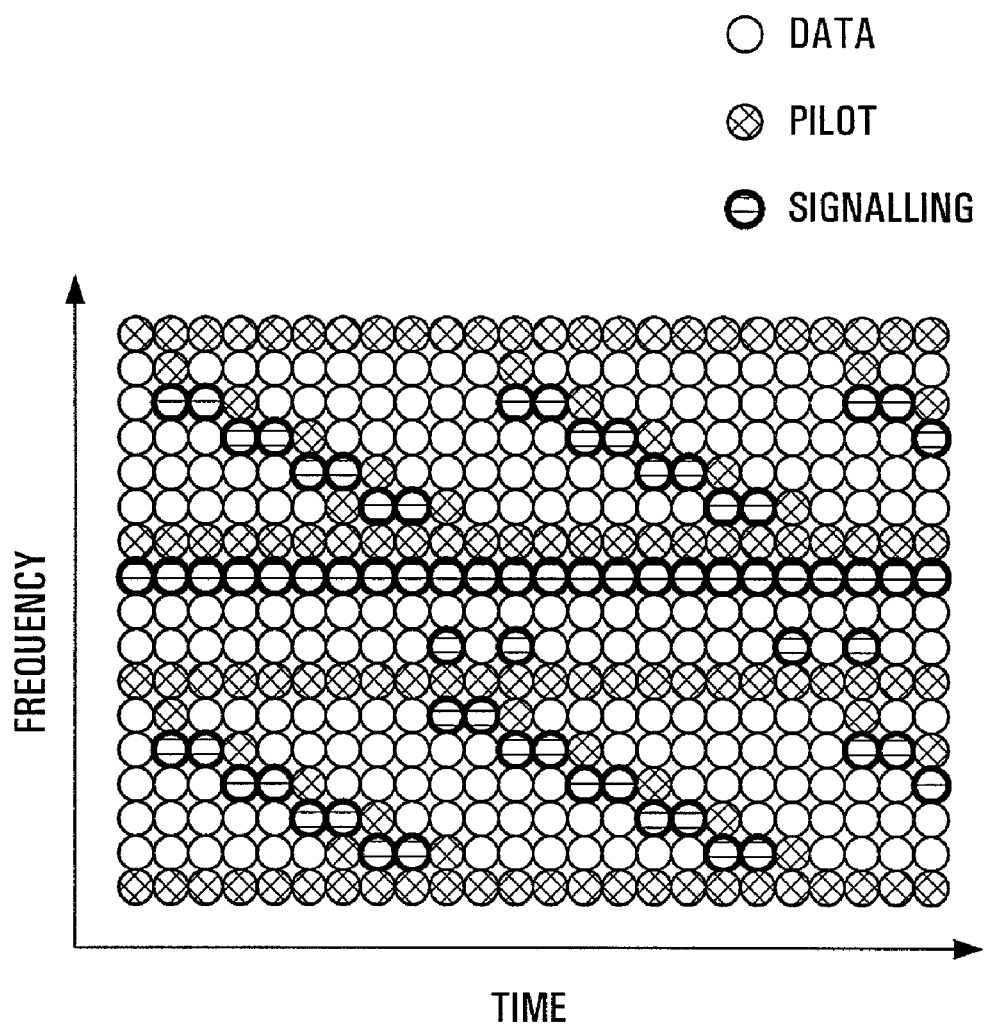
FIG. 3 is a chart illustrating pilot and signalling channels changing frequency over time within an RF channel.

FIG. 3 is a chart illustrating data, pilot and signalling sub-carrier frequency allocations over time within an RF channel. This implementation for an OFDM system is referred to as a "wandering" frequency allocation. In other implementations, the frequency allocations can be fixed. Both wandering and fixed plot and signalling carriers are used, for example, in the DVB-T transmission standard (see ETSI standard EN 300 744 V1.1.2 (1997-08) European Standard (Telecommunications series) Digital Video Broadcasting (DVB); framing structure, channel coding and modulation for digital terrestrial television). In either case, at any one time, each carrier is being utilized by only one of the data, signalling and pilot channels. Hence, by separating out the carriers, it is possible to separate the data, signalling and pilot channels into a plurality of separate transmissions. This is an important aspect of embodiments of the present invention described below with reference to FIGS. 4 to 9. If the wandering frequency allocation is used, it should be understood in the following description that the apparatus is operated to take into account the changing frequencies of the carriers for the data, signalling and pilots. These changes occur according to a pattern that is known to both the transmitter and the receiver of the radio system.

These figures illustrate how the carriers fit together such that a mobile terminal receiver may receive the signalling and pilot channels, the data channels, or both if the channels are transmitted through antennas with differing coverage areas by the BTS 50.

Figure 4A:
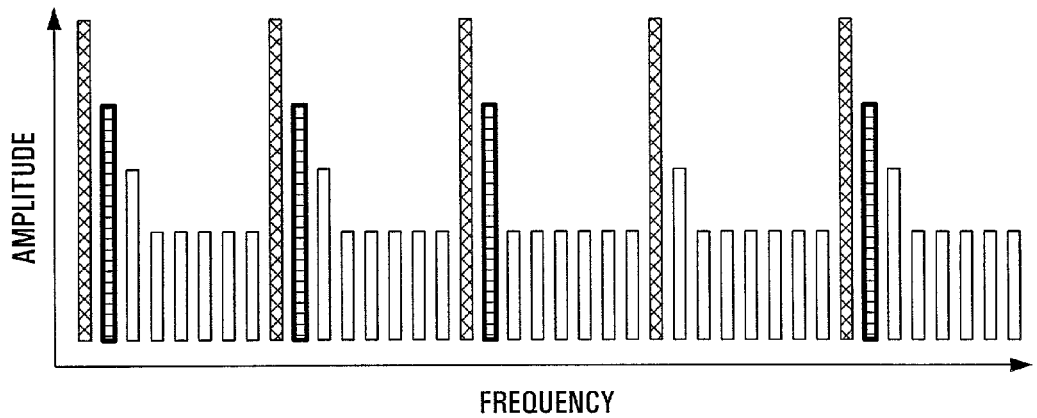
FIGS. 4A, 4B and 4C are charts illustrating a sample OFDM signal, the sample OFDM signal with the data traffic channels removed and the sample OFDM signal with the pilot and signalling channels removed respectively.

In some embodiments of the present invention, a different antenna implementation than is described above for the implementation of FIG. 1 is utilized to ensure a sufficiently powerful transmission of the data channels to the target mobile terminal while still maintaining transmission of the pilot and signalling channels to any other mobile terminals within the coverage area. In these embodiments of the present invention, the RF channel is divided into at least two separate transmissions, at least one for the data channels and at least one for the pilot and signalling channels. One possible division of an RF channel is illustrated within FIGS. 4A through 4C. FIG. 4A is a chart illustrating a sample OFDM signal in which pilot, signalling and data channels are shown together. Here the pilot, signalling and data carriers are shown with a similar legend as illustrated on FIG. 3. As depicted, these carriers are shown with differing amplitudes. Typically, the amplitude of each carrier would be chosen based upon the radio propagation conditions and the modulation and coding being used. If the wandering pilot and signalling scheme were utilized, the frequency location of the channels would change with time. One of the data carriers is shown with an increased amplitude to indicate, as noted previously, that the data channel may include pilot carriers to enable the receiver to estimate the radio channel propagation conditions.

Figure 4B:
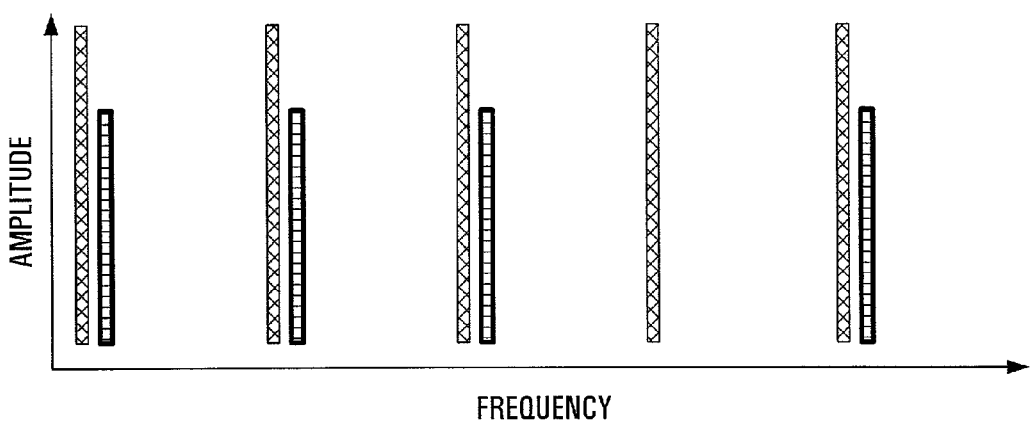
Figure 4C:
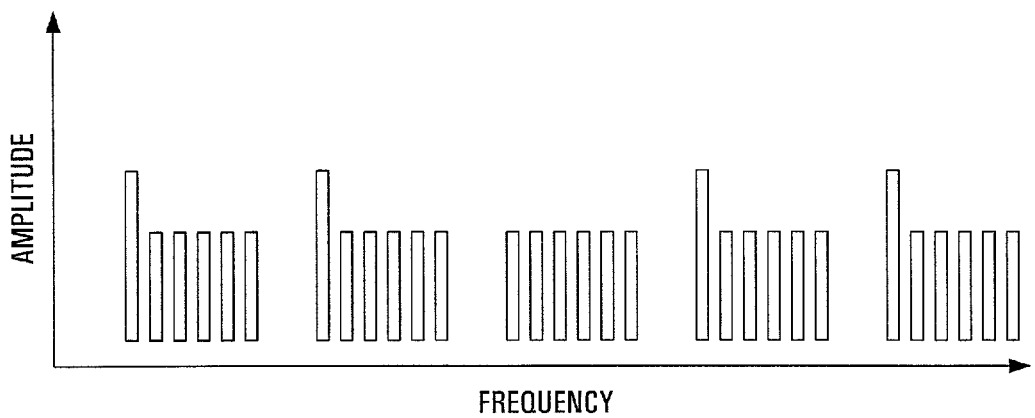

FIG. 4B is a chart illustrating the same sample OFDM signal of FIG. 4A with the data channels removed, hence leaving only the signalling and pilot channels. FIG. 4C is a chart illustrating the same sample OFDM signal of FIG. 4A with the pilot and signalling channels removed, hence leaving only the data channels.

Embodiments for transmitting the signal of FIG. 4C to the target mobile terminal while transmitting the signal of FIG. 4B to all of the mobile terminals within the coverage area will now be described with reference to FIGS. 5 through 9. In these embodiments, there are only two transmissions, though this should not limit the scope of the present invention. It should be recognized that expansions of these embodiments could be designed in which the OFDM signals are divided into more than two transmissions. For instance, in one alternative embodiment, data, pilot and signalling channels could each have separate transmissions.

Figure 5:
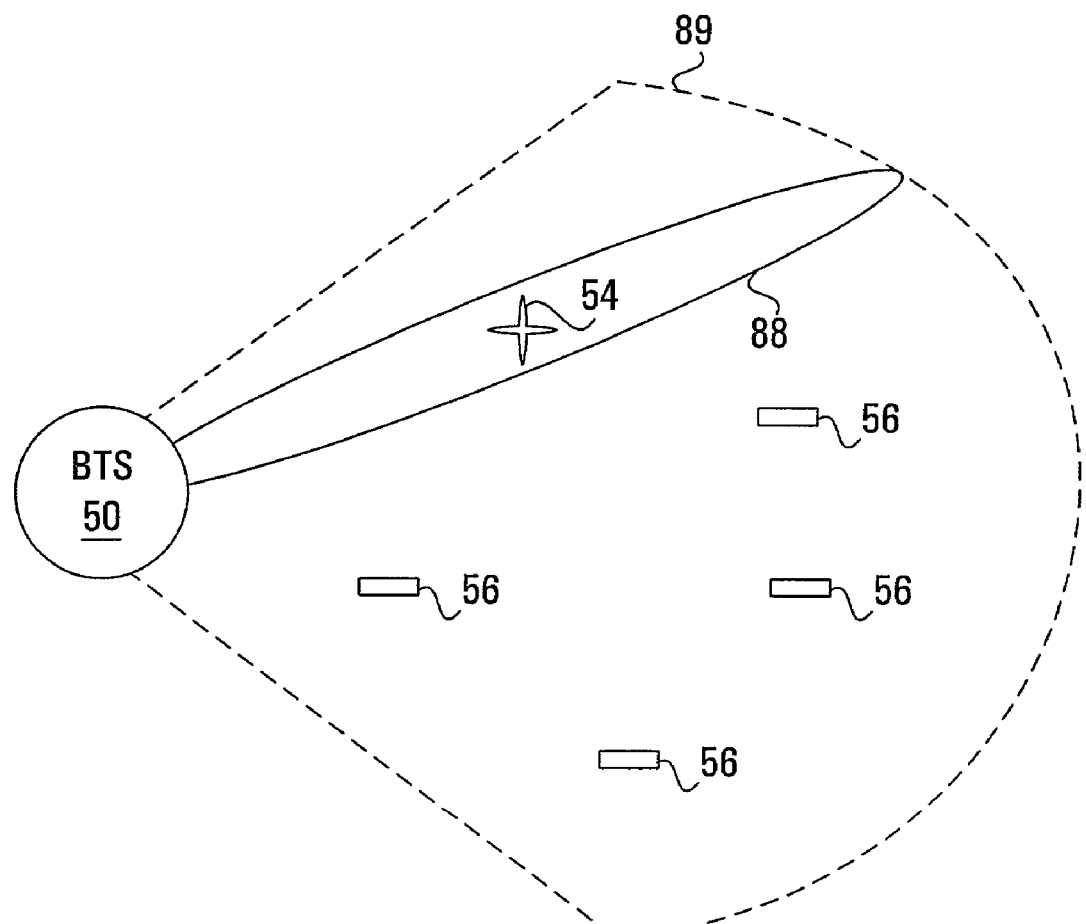
FIG. 5 is a block diagram illustrating a radio system using OFDM with a directional data traffic beam and a sector omni-directional service beam.

FIG. 5 is a block diagram illustrating a radio system using OFDM, according to a second embodiment of the present invention, similar to that depicted in FIG. 1 but with the BTS 50 having a directional transmission beam for the data channels, hereinafter referred to as a data traffic directional beam, and a separate sector omni-directional transmission beam for the pilot and signalling channels, hereinafter referred to as a service sector omni-directional beam. Within FIG. 5, a directional beam 88 is utilized as the data traffic beam in order for the BTS 50 to transmit the data traffic with sufficient link gain to the target mobile terminal 54 while a sector omni-directional beam 89 is utilized as the service beam in order for the BTS 50 to transmit the pilot and signalling channels continually to all of the mobile terminals in its coverage area. A sector omni-directional beam is generally sufficient for transmission of the pilot and signalling channels to the mobile terminals since the bit rate of these transmissions is generally lower compared with that for the data traffic channels.

To enable a sufficient link budget, the service sector omni-directional beam may have a different modulation or symbol rate compared to the data directional beam in order to compensate for the broader service beam. In one implementation, the Hierarchical modulation technique used in the DVB-T standard as described previously is used for the service beam. In this case, the data directional beam is operated in the full modulation constellation while the service sector omni-directional beam operates in the smaller modulation constellation. One advantage of this technique is that the same receiver can be used to receive both portions of the OFDM signal.

Figure 6A:
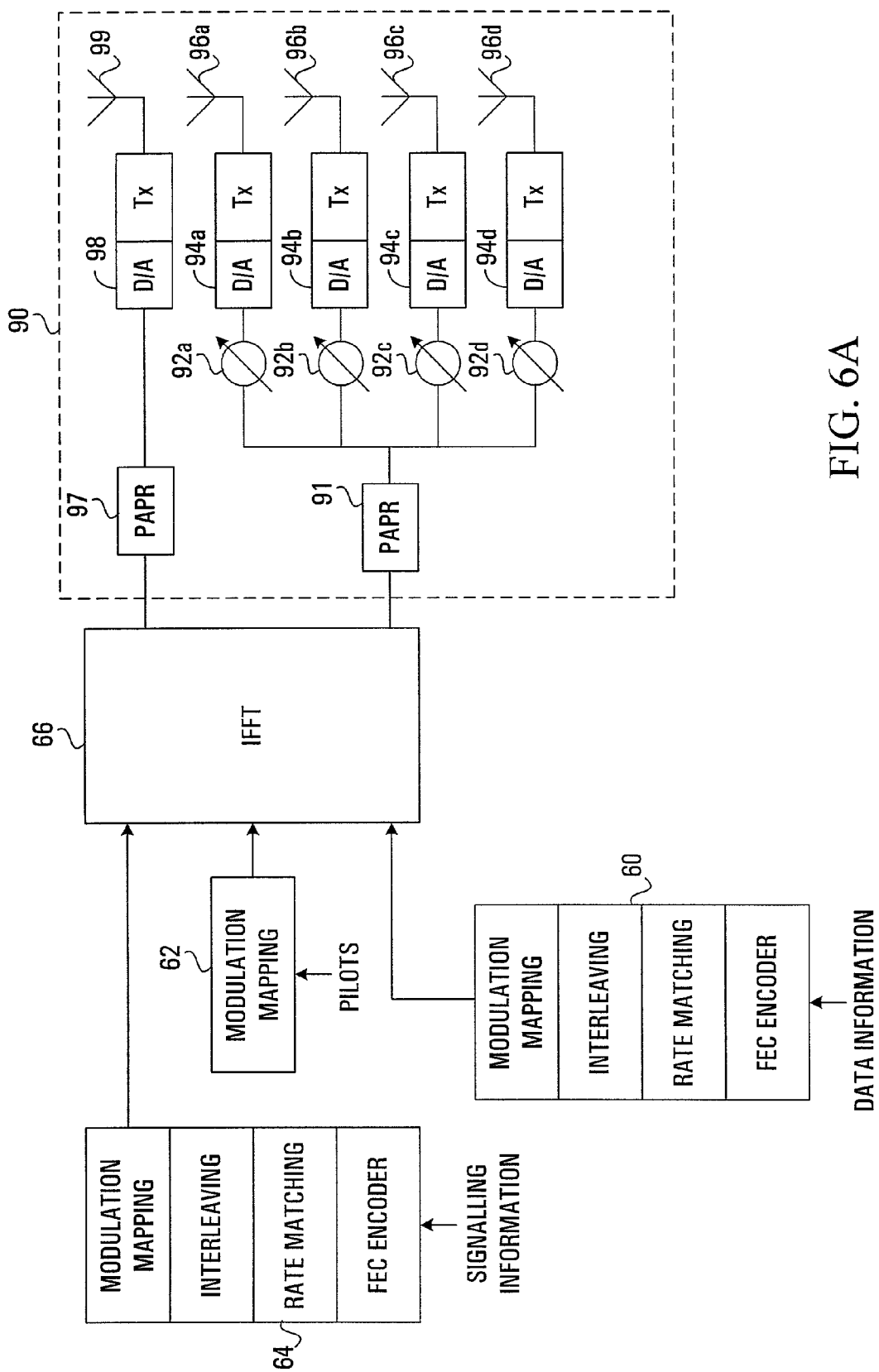
FIGS. 6A, 6B and 6C are block diagrams illustrating first, second and third implementations of the BTS of FIG. 5.
Figure 6B:
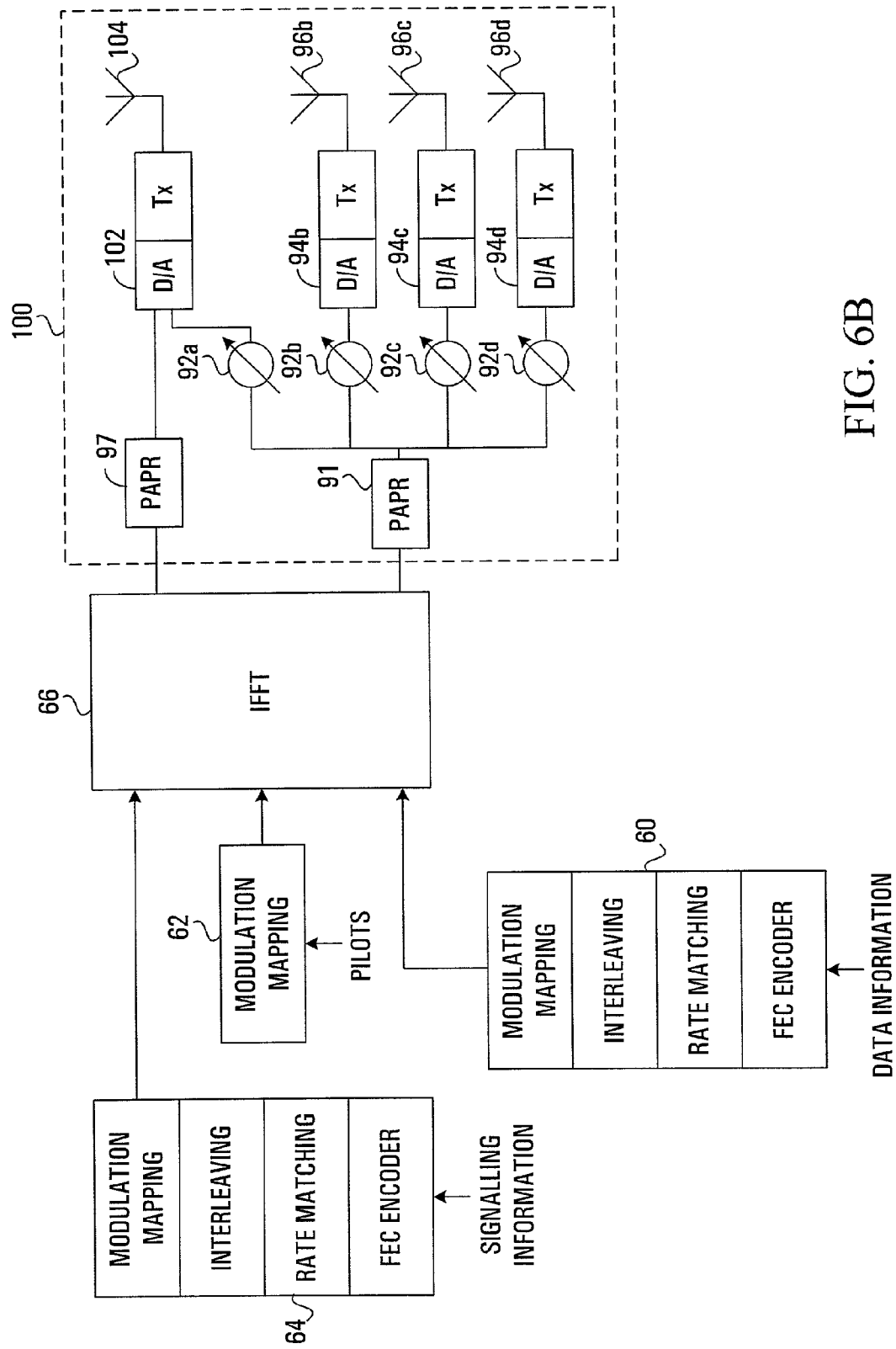
Figure 6C:
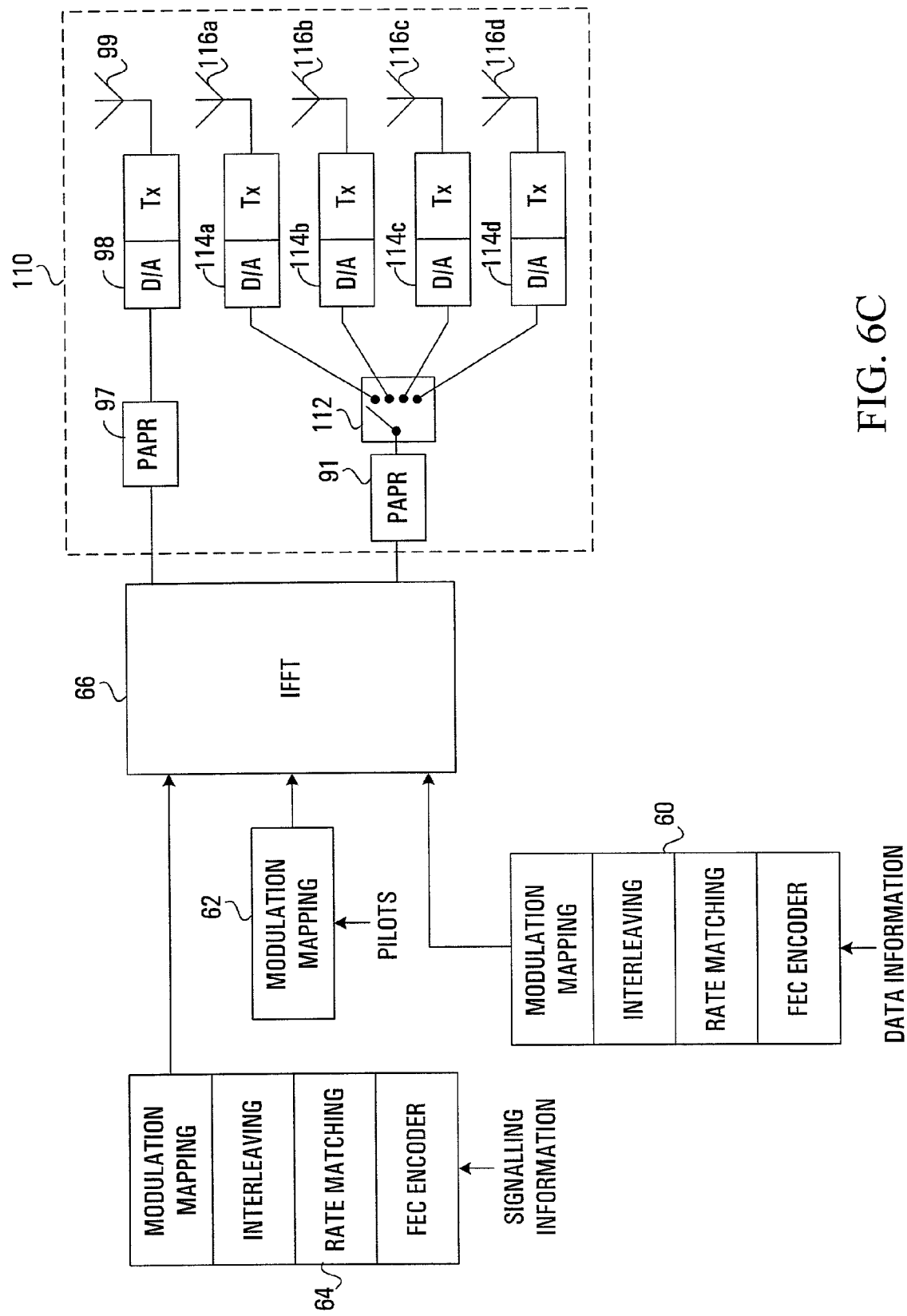

FIGS. 6A, 6B and 6C are block diagrams illustrating first, second and third possible implementations of the BTS 50 of the second embodiment of the invention. These possible implementations of the BTS 50 include an identical data information processor 60, signalling information processor 62, pilot processor 64 and IFFT block 66 as described above for FIGS. 2A and 2B. Similar to the BTS of FIGS. 2A and 2B, the blocks 60, 62, 64, 66 of FIGS. 6A, 6B, 6C could be implemented with alternative versions as discussed above.

The difference between the BTS designs of FIGS. 2A, 2B, 6A, 6B and 6C are the different implementations of their respective output blocks. FIGS. 6A, 6B and 6C illustrate three possible implementations of output blocks that allow for the generation of the transmission beams 88, 89 of FIG. 5 according to the second embodiment of the present invention. The below description of these three implementations should not limit the scope of the present invention for it should be understood that these sample implementations are not meant to be an inclusive set of all possible implementations.

For the implementation illustrated within FIG. 6A, the BTS 50 includes an output block 90 that comprises a data traffic beam PAPR block 91 coupled to the IFFT block 66 and further coupled to a plurality of parallel data traffic beam output paths; and a service beam PAPR block 97 coupled to the IFFT block 66 as well as a separate service beam output path. The operation of the PAPR blocks 91, 97 are similar to that described above for block 71 with reference to FIG. 2A. As well, similar to that described above with FIG. 2A, each of the data traffic beam output paths comprises a respective phase adjuster 92a, 92b, 92c, 92d coupled to the PAPR block 91 and further coupled in series with a respective outputting apparatus 94a, 94b, 94c, 94d and a respective antenna 96a, 96b, 96c, 96d. In this implementation the antennas 96a, 96b, 96c, 96d are sector omni-directional antennas with the directional beam 88 being formed through the use of the phase adjusters. The phase adjusters 92a, 92b, 92c, 92d each receive the data traffic sub-carrier's time sequences from the PAPR block 91 and adjust the phase of the sub-carrier time sequences in order to dictate the particular direction the array of antennas' transmits the strongest energy. Hence, to generate the data traffic beam 88 as described above for the second embodiment of the present invention, the phase adjusters 92a, 92b, 92c, 92d are adjusted such that the transmission energy is directed to the target mobile terminal. As discussed previously, a beam direction control block similar to that described above for block 78 would be further implemented to control the phase adjusters 92a, 92b, 92c, 92d.

The service beam output path comprises an outputting apparatus 98 coupled between the PAPR block 97 and a service beam antenna 99. In this implementation, the outputting apparatus 98 receives the pilot and signalling data-carrier's time sequence from the PAPR block 97 and, after processing these time sequences, forwards them to the antenna 99. The antenna 99 is a sector omni-directional antenna that allows for the transmission of the service beam 89 throughout the coverage area of the BTS 50 with relatively even link gain.

Similar to that described above for the output block of FIG. 2A, the outputting apparatus 94a, 94b, 94c, 94d, 98 of FIG. 6A each comprise a D/A converter and a transmitter coupled to their respective antennas 96a, 96b, 96c, 96d, 99. The implementation and operation of the components within the outputting apparatus would be well-known by one skilled in the art.

In the implementation of FIG. 6A, and in further implementations described herein, the IFFT block 66 provides two output time sequences, one for the service sub-carriers (pilot and signalling) and the other for the data traffic sub-carriers. These two time sequences may be readily formed by the IFFT block 66 by performing two IFFT operations on the two groups of sub-carriers. Alternatively, a single IFFT operation could be performed but with a modified output calculation utilizing two output accumulators, each accumulator arranged to include only components of the corresponding sub-carriers.

For the implementation illustrated in FIG. 6B, the BTS 50 includes an output block 100 which is virtually identical to that described above with reference to FIG. 6A. The alternative that is being illustrated in FIG. 6B is the sharing of the service beam antenna with one of the data traffic beam antenna. As depicted within FIG. 6B, an outputting apparatus 102 is coupled to the PAPR 97 in order to receive a pilot and signalling sub-carrier time sequence while the apparatus 102 is further coupled to the first data traffic phase adjuster 92a in order to receive phase adjusted data traffic sub-carrier time sequences. As shown in FIG. 6B, the outputting apparatus 102 is yet further coupled to an antenna 104. Similar to the outputting apparatus of FIG. 6A, the outputting apparatus 102 comprises a D/A converter and a transmitter.

The sharing of the antenna 104 is possible because, as discussed above, the pilot and signalling sub-carriers and the data traffic sub-carriers operate with different carriers. With this implementation, the phase adjusted data carriers transmitted from the sector omni-directional antenna 104 work in unison with the phase adjusted data carrier transmissions from the other data traffic sector omni-directional antenna 96b, 96c, 96d to generate a directional data traffic beam. The shared antenna 104 also generates a sector omni-directional service beam due to the pilot and signalling sub-carriers being transmitted on the omni-directional antenna. In this implementation, as well as other implementations described herein below in which an outputting apparatus receives two input time sequences, the outputting apparatus can readily combine the two time sequences into a single stream by adding together the time coincident pairs of the two time sequences. In this case, the relevant PAPR blocks must include the additional summation in determining their compensation to limit the peak power.

Now turning to the alternative implementation depicted within FIG. 6C, the BTS 50 includes an output block 110 that comprises a PAPR 91, a switch 112 and a plurality of data traffic beam output paths similar to that depicted within FIG. 2B while also comprising a PAPR block 97 and a service beam output path similar to that depicted within FIG. 6A. Each of the data traffic beam output paths comprises a respective outputting apparatus 114a, 114b, 114c, 114d coupled to the switch 112 and further coupled in series with a respective directional antenna 116a, 116b, 116c, 116d. Similar to that described above for FIG. 2B, each of the directional antennas 116a, 116b, 116c, 116d have a different principle direction for the strongest energy to be transmitted. Hence, to generate the data traffic directional beam the switch 112 switches the data sub-carrier time sequences to a different data traffic beam output path so that the target mobile terminal is being transmitted to with a sufficient link gain. Similar to that described with reference to FIG. 6A, the service beam output path comprises an outputting apparatus 98 coupled between the PAPR block 97 and a sector omni-directional antenna 99. As described previously, the outputting apparatus 98 receives a pilot and signalling sub-carrier time sequence from the PAPR block 97 and, after processing this time sequence, forwards it to the antenna 99. The antenna 99 is a sector omni-directional antenna that allows for the transmission of the service beam throughout the coverage area of the BTS 50 with relatively even power.

As illustrated in FIG. 6C, the outputting apparatus 114a, 114b, 114c, 114d, 98 are identical to those described previously with reference to FIGS. 2A, 2B, 6A and 6B.

As discussed with reference to FIG. 2B, an alternative implementation with a single data traffic beam outputting apparatus is possible by having the switch 112 located between the single data traffic beam outputting apparatus and the plurality of directional antennas 116a, 116b, 116c, 116d. In this case, as discussed previously, the switch must be sufficient to handle signals of relatively high power in this implementation.

Similar to that described above for the first embodiment, the second embodiment of the present invention should not be limited to having four parallel data traffic beam output paths with an antenna array of four within the output block. In particular, it should be understood that additional antennas could be included within the array, each additional antenna having yet another parallel data traffic beam output path. If the output block implementation of FIG. 6A or 6B had greater than four data traffic beam output paths with corresponding antennas, an increasingly focussed directional beam could be possible. If the output block implementation of FIG. 6C had greater than four data traffic beam output paths with corresponding antennas, each antenna could be designed to focus on a smaller slice of the overall coverage area, hence allowing for greater link gain. Similarly, it should be recognized that it is possible to implement the present invention with less than four output paths with corresponding antennas.

In another alternative implementation of the second embodiment of the present invention, the sector omni-directional beam 89 could be replaced with a plurality of partial sector omni-directional beams, each of the partial sector omni-directional beams covering a subset of the overall coverage area. In this case, additional antennas would be required to cover the entire the coverage area. One advantage of this alternative is the increased power that is possible for transmitting the pilot and signalling channels if the sector omni-directional beam is divided into a plurality of more narrowly focussed beams.

Figure 7:
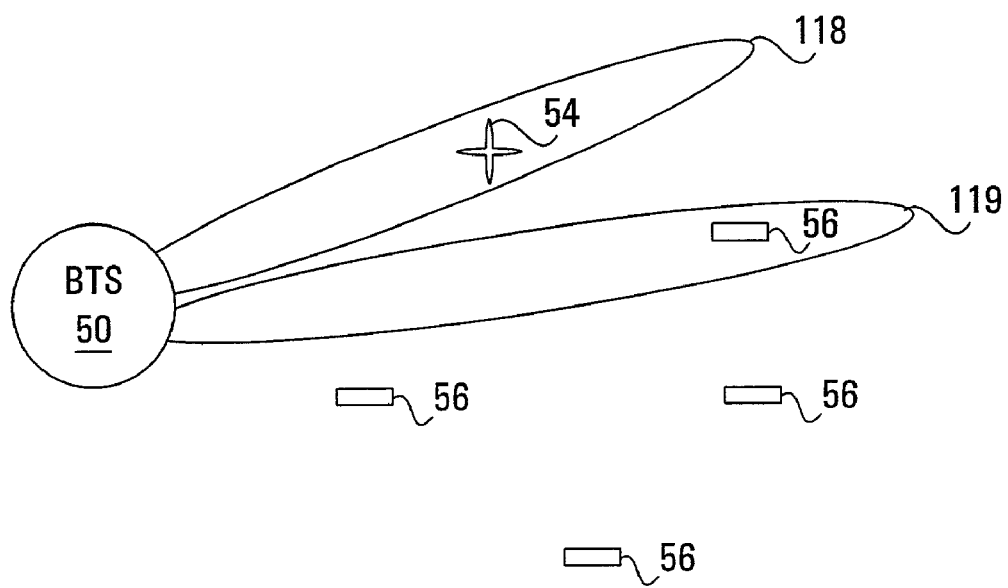
FIG. 7 is a block diagram illustrating a radio system using OFDM with a directional data traffic beam and a rotating directional service beam.

FIG. 7 is a block diagram illustrating a radio system using OFDM, according to a third embodiment of the present invention, similar to that depicted in FIG. 5 but with the BTS 50 having a data traffic directional beam 118 and a separate service directional beam 119. Within FIG. 7, the data traffic directional beam 118 allows the BTS 50 to transmit the data traffic with sufficient link gain to the target mobile terminal 54 similar to that described for FIG. 6A while the service directional beam 119 allows the BTS 50 to transmit the pilot and signalling channels to all of the mobile terminals in its coverage area. This alternative is particularly advantageous in cases where the link gain of a sector omni-directional beam is not sufficient for transmission of the pilot and/or signalling channels to the mobile terminals. The directional service beam can be swept about the coverage area to reach all of the mobile terminals in time. Additionally, a plurality of service beams 118 could be used to reach a plurality of mobile terminals simultaneously. The service beam may also be directed to a target mobile terminal for transmission of specialized signalling messages.

Figure 8A:
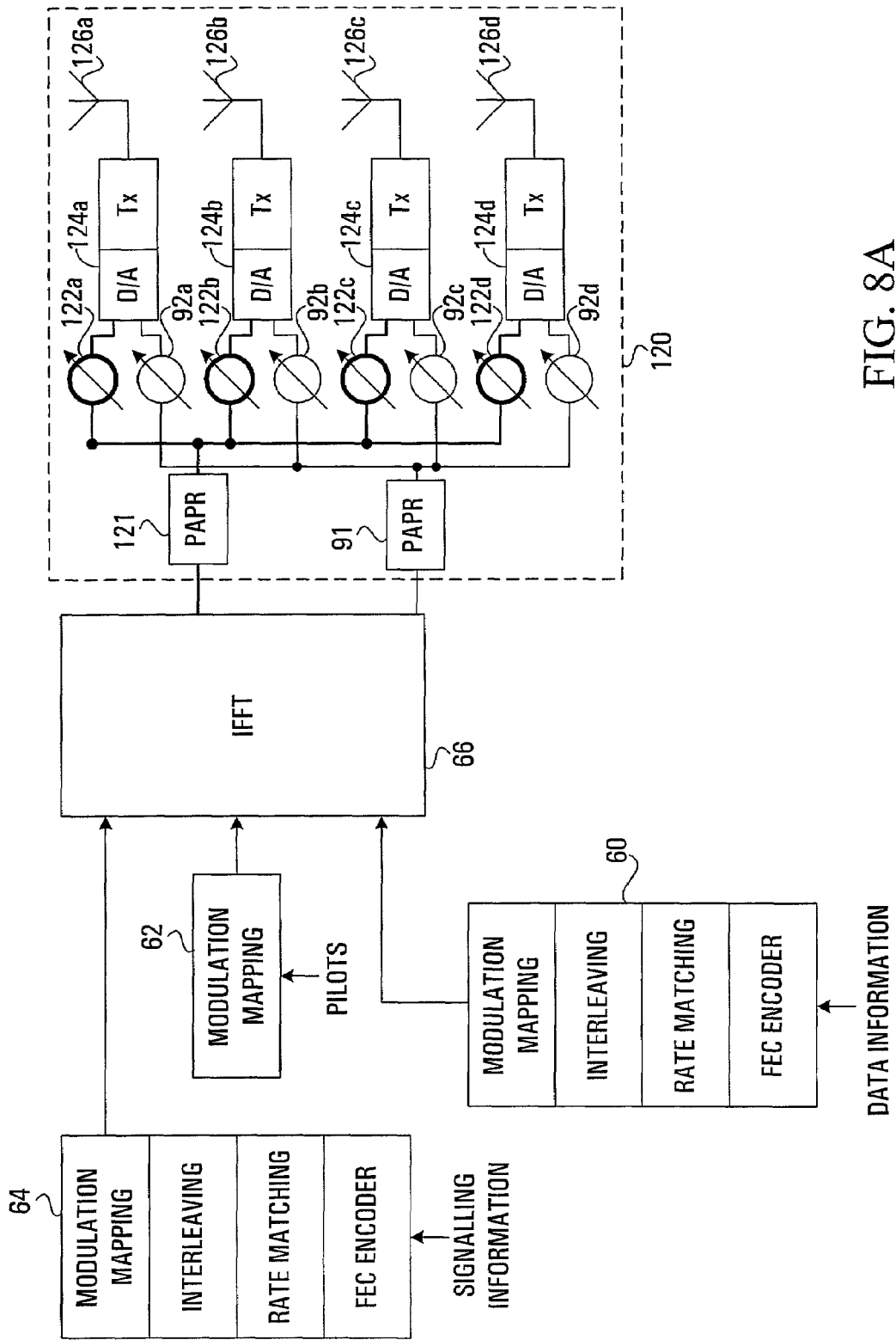
FIGS. 8A, 8B and 8C are block diagrams illustrating first, second and third implementations of the BTS of FIG. 7.
Figure 8B:
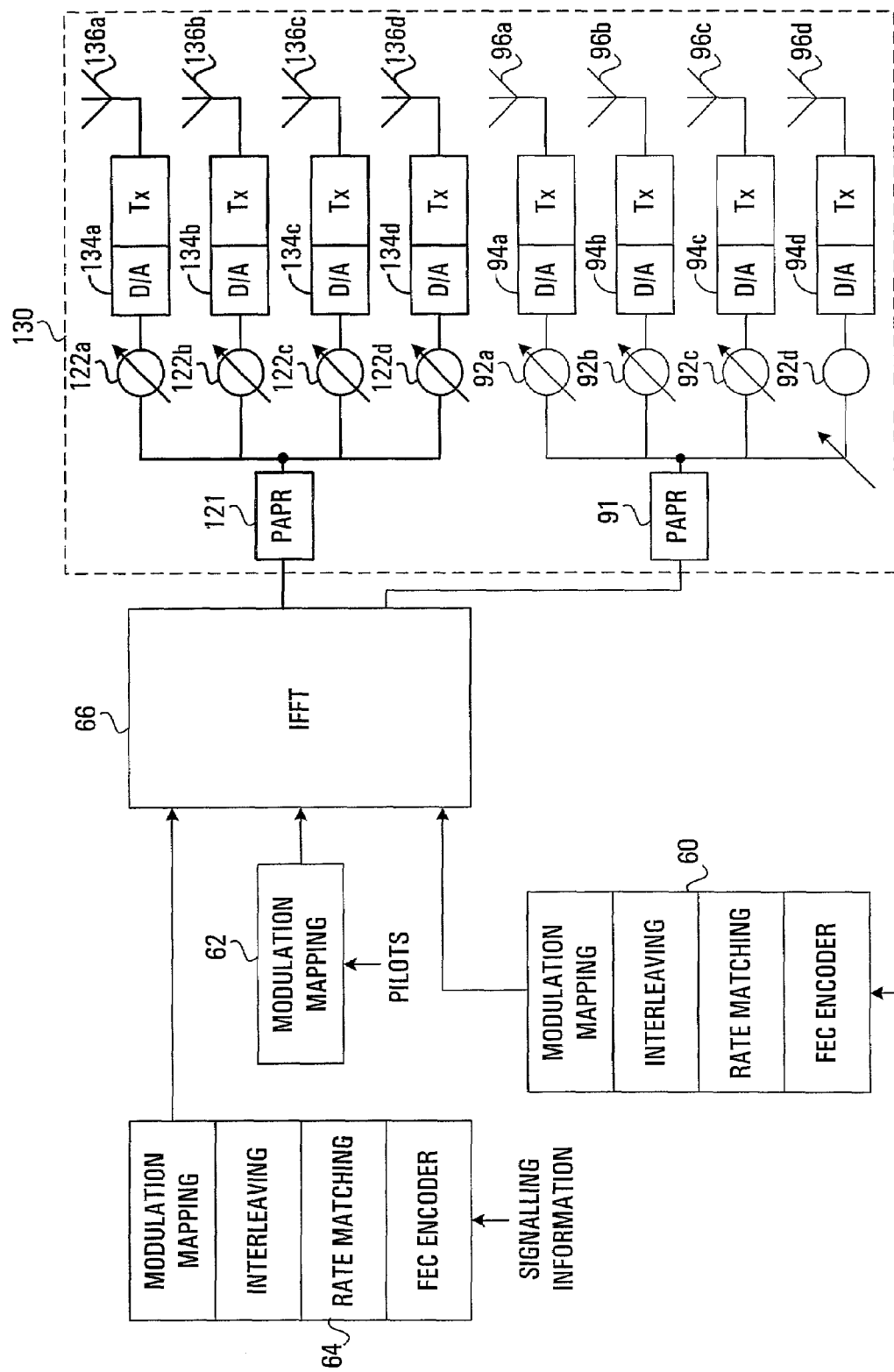
Figure 8C:
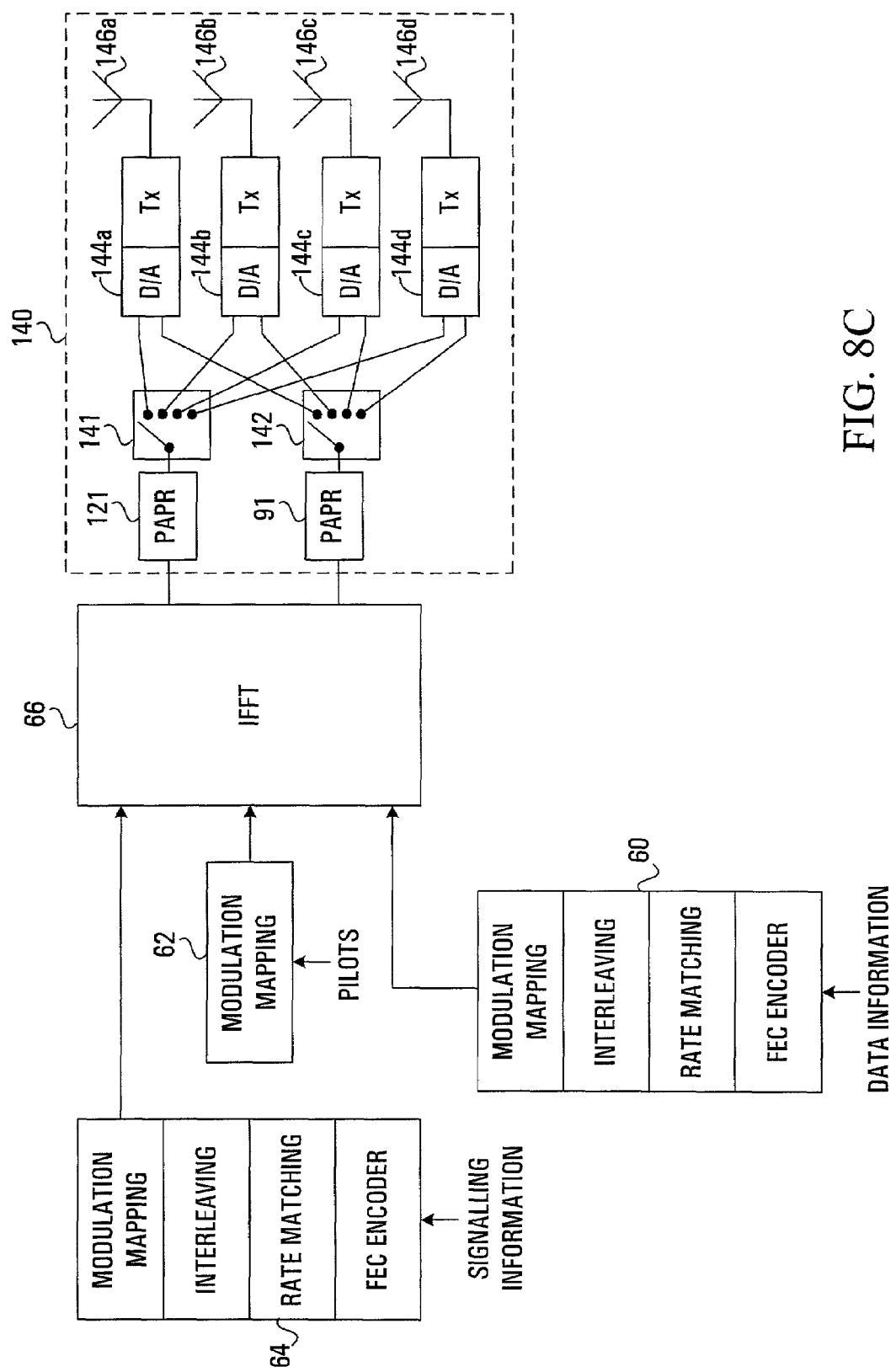

FIGS. 8A, 8B and 8C are block diagrams illustrating first, second and third possible implementations of the BTS 50 of the third embodiment of the invention. These possible implementations of the BTS 50 include an identical data information processor 60, signalling information processor 62, pilot processor 64 and IFFT block 66 as described above for FIGS. 2A, 2B, 6A, 6B and 6C. Similar to the BTS of the previous figures, the blocks 60, 62, 64, 66 of FIGS. 8A, 8B, 8C could be implemented with alternative versions as discussed above.

The difference between the BTS designs of FIGS. 2A, 2B, 6A, 6B, 6C, 8A, 8B and 8C are the different implementations of their respective output blocks. FIGS. 8A, 8B and 8C illustrate three possible implementations of output blocks that allow for the generation of the transmission beams 118, 119 of FIG. 7 according to the third embodiment of the present invention. The below description of these three implementations should not limit the scope of the present invention for it should be understood that these sample implementations are not meant to be an inclusive set of all possible implementations.

For the implementation illustrated within FIG. 8A, the BTS 50 includes an output block 120 that comprises a data traffic beam PAPR 91 and a service beam PAPR block 121 as described previously as well as a plurality of parallel output paths that are shared between the data traffic directional beam transmission and the rotating service directional beam transmission. As depicted within FIG. 8A, each of the output paths comprise a respective outputting apparatus 124a, 124b, 124c, 124d; a respective data traffic beam phase adjuster 92a, 92b, 92c, 92d coupled between the data traffic beam PAPR block 91 and the respective outputting apparatus 124a, 124b, 124c, 124d; a respective service beam phase adjuster 122a, 122b, 122c, 122d coupled between the service beam PAPR block 121 and the respective outputting apparatus 124a, 124b, 124c, 124d; and a respective sector omni-directional antenna 126a, 126b, 126c, 126d. These sector omni-directional antennas are directed to form the beams by means of the phase adjusters that are controlled by respective beam direction control blocks (not shown) similar to the block 78 described previously with reference to FIG. 2A.

In this implementation, the data traffic beam phase adjusters 92a, 92b, 92c, 92d each receive a data traffic sub-carrier time sequence from the PAPR block 91 and adjust the phase of the sub-carrier time sequence in order to dictate the particular direction the array of antennas' transmits the data channels with the greatest link gain. Hence, to generate the data traffic beam 118 as described above for the third embodiment of the present invention, the phase adjusters 92a, 92b, 92c, 92d are adjusted such that the transmission energy is directed to the target mobile terminal. On the other hand, the service beam phase adjusters 122a, 122b, 122c, 122d each receive a service sub-carrier time sequence from the PAPR block 121 and adjust the phase of the service beam sub-carrier time sequence to dictate the particular direction the array of antennas' transmits the pilot and signalling channels with the greatest link gain. Hence, to generate the service directional beam 119 as described above for the third embodiment of the present invention, the service beam phase adjusters 122a, 122b, 122c, 122d are adjusted systematically such that the transmission energy is directed to all areas within the coverage area for the proper time period.

Similar to that described above for other output blocks, the outputting apparatus 124a, 124b, 124c, 124d of FIG. 8A each comprise a D/A converter and a transmitter coupled to their respective antennas 126a, 126b, 126c, 126d. The implementation and operation of the components within the outputting apparatus would be well-known by one skilled in the art.

For the implementation illustrated in FIG. 8B, the BTS 50 includes an output block 130 which is virtually identical to that described above with reference to FIG. 8A, but with separate output paths for the data traffic and service beams.

As depicted within FIG. 8B, the output block 130 comprises the PAPR blocks 91, 121 and four parallel data traffic beam output paths identical to those illustrated in FIG. 6A along with four parallel service beam output paths. Each of the data traffic beam output paths comprises a respective data traffic beam phase adjuster 92a, 92b, 92c, 92d coupled to the data traffic beam PAPR block 91 and further coupled in series with a respective outputting apparatus 94a, 94b, 94c, 94d and a respective sector omni-directional antenna 96a, 96b, 96c, 96d. On the other hand, each of the service beam output paths comprises a respective service beam phase adjuster 122a, 122b, 122c, 122d coupled to the service beam PAPR block 121 and further coupled in series with a respective outputting apparatus 134a, 134b, 134c, 134d and a respective sector omni-directional antenna 136a, 136b, 136c, 136d. In this implementation, the data traffic beam phase adjusters 92a, 92b, 92c, 92d each receive a data traffic sub-carrier time sequence from the data traffic beam PAPR block 91 and adjust the phase of the sub-carrier time sequence in order to dictate the particular direction the array of antennas' transmits the data channels with the greatest link gain. On the other hand, the phase by which each of the service beam phase adjusters 122a, 122b, 122c, 122d adjusts the service beam sub-carrier time sequence dictates the particular direction the array of antennas' transmits the pilot and signalling channels with the greatest link gain. The eight parallel output paths within FIG. 8B operate together to generate the data traffic and service beams 118, 119 similar to those generated by the output block 120 of FIG. 8A.

Now turning to the alternative implementation depicted within FIG. 8C, the BTS 50 includes an output block 140 that comprises the data traffic beam PAPR block 91 coupled to the IFFT block 66; a data traffic beam switch 141 coupled to the data traffic beam PAPR block 91; a service beam PAPR block 121 coupled to the IFFT block 66; a service beam switch 142 coupled to the service beam PAPR block 121; and a plurality of output paths similar to that depicted within FIG. 2B coupled to both of the switches 141, 142. Each of the output paths comprises a respective outputting apparatus 144a, 144b, 144c, 144d independently coupled to each of the switches 141, 142 and further coupled in series with a respective directional antenna 146a, 146b, 146c, 146d. Similar to that described above for FIG. 2B, each of the directional antennas 146a, 146b, 146c, 146d have a different principle direction for the strongest energy to be transmitted. Hence, to generate the data traffic directional beam 118 the switch 141 switches the data sub-carrier time sequences to a different output path so that the target mobile terminal is being transmitted to with sufficient link gain. To generate the rotating service directional beam 119, as described above for the third embodiment of the present invention, the switch 142 systematically switches the pilot and signalling sub-carrier time sequences to different outputting paths such that each mobile terminal within the coverage area is being transmitted to during the proper time period. As illustrated in FIG. 8C, the outputting apparatus 144a, 144b, 144c, 144d are identical to those described previously.

The above description with reference to FIG. 8C is applicable to a case that can utilize low power switches. A similar alternative to that described previously can apply to this embodiment with the switches 141, 142 located between a single outputting apparatus and the plurality of antennas. In this case, the switches would need to be extremely high power which might make this alternative impractical with current technology.

Similar to that described above for the first and second embodiments, the third embodiment of the present invention should not be limited to having four parallel data traffic and service beam output paths with an antenna array of four within the output block. It should be understood, similar to the embodiments described above, more or less than four output paths could be used in implementations according to the third embodiment of the present invention. Further, although not illustrated in the attached figures other alternatives could be made to the implementations illustrated in FIGS. 8A, 8B and 8C. For instance, the embodiment of FIG. 8C could be implemented with separate output paths for the data traffic and service beams. This would be a similar alternative to the implementation of FIG. 8B compared to the implementation of FIG. 8A.

Although depicted as beams of similar focus on FIG. 7, it should be recognized that the rotating service directional beam could be broader than the data directional beam. For radio systems in which the receiver must estimate the channel propagation conditions, it is most advantageous for the two beams to be of the same pattern so that the pilot signals received from the service beam transmission closely match those of the data traffic beam.

To enable a sufficient link budget, the rotating service directional beam may have a different modulation or symbol rate compared to the data directional beam in order to compensate for a broader beam. In one particular implementation, the hierarchical modulation technique used in the DVB-T standard as described herein above is used for the rotating service directional beam. In this case, the data directional beam is operated in the full modulation constellation while the rotating service directional beam operates in the smaller modulation constellation. One advantage of this technique is that the same receiver can be used to receive both portions of the OFDM signals.

Figure 9:
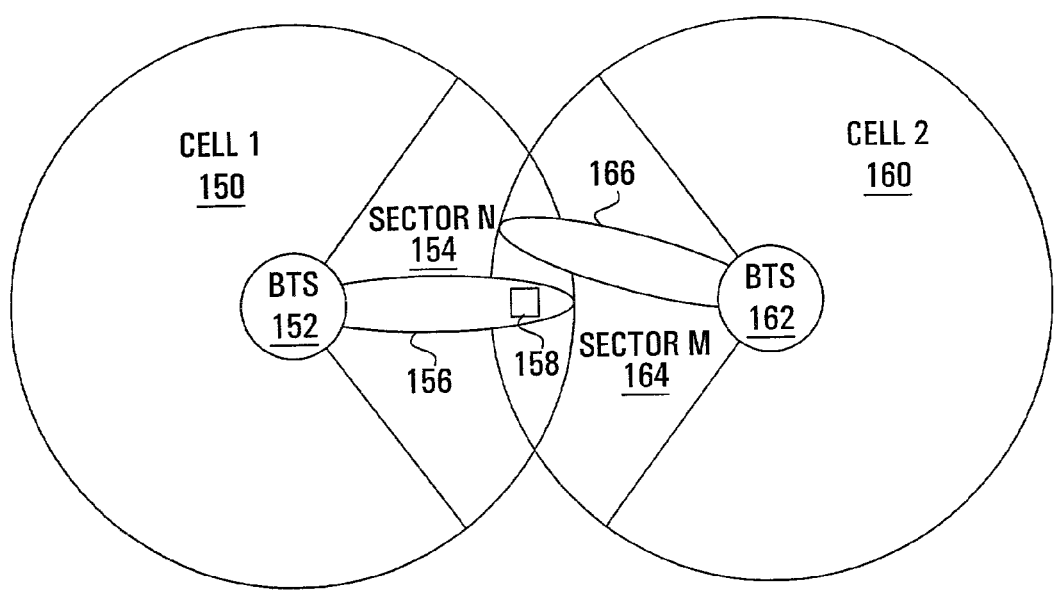
FIG. 9 is a block diagram illustrating a radio system using OFDM in which two adjacent sectors each have a rotating directional beam.

FIG. 9 is a block diagram illustrating a radio system using OFDM in which two adjacent sectors each have a rotating directional beam. As depicted, first and second cells 150, 160 comprise respective BTS 152, 154 which transmit OFDM signals within sector N 154 and sector M 164 respectively. Within these sectors 154, 164, the BTS 152, 162 transmit respective rotating directional beams 156, 166. This could occur in any one of the implementations of the embodiments of the invention in which a rotating directional beam is utilized. In this case, one area of concern is the possibility that both rotating directional beams could overlap at a particular mobile terminal, mobile terminal 158 within FIG. 9 for example. If the sub-carriers within the rotating directional beams 156, 166 are utilizing common carriers this could cause significant interference at the mobile terminal. To avoid this problem, the rotating directional beams 156, 166 can be timed such that they are not both focussed on the same mobile terminal at the same time. As well, to avoid possible interference, techniques such as coding or other interference cancellation techniques could be utilized to enable the receiver to differentiate the transmissions (data, pilot, signalling) from the two or more beams. This allows for acceptable frequency re-use while not increasing frequency interference between cells significantly.

Figure 10:
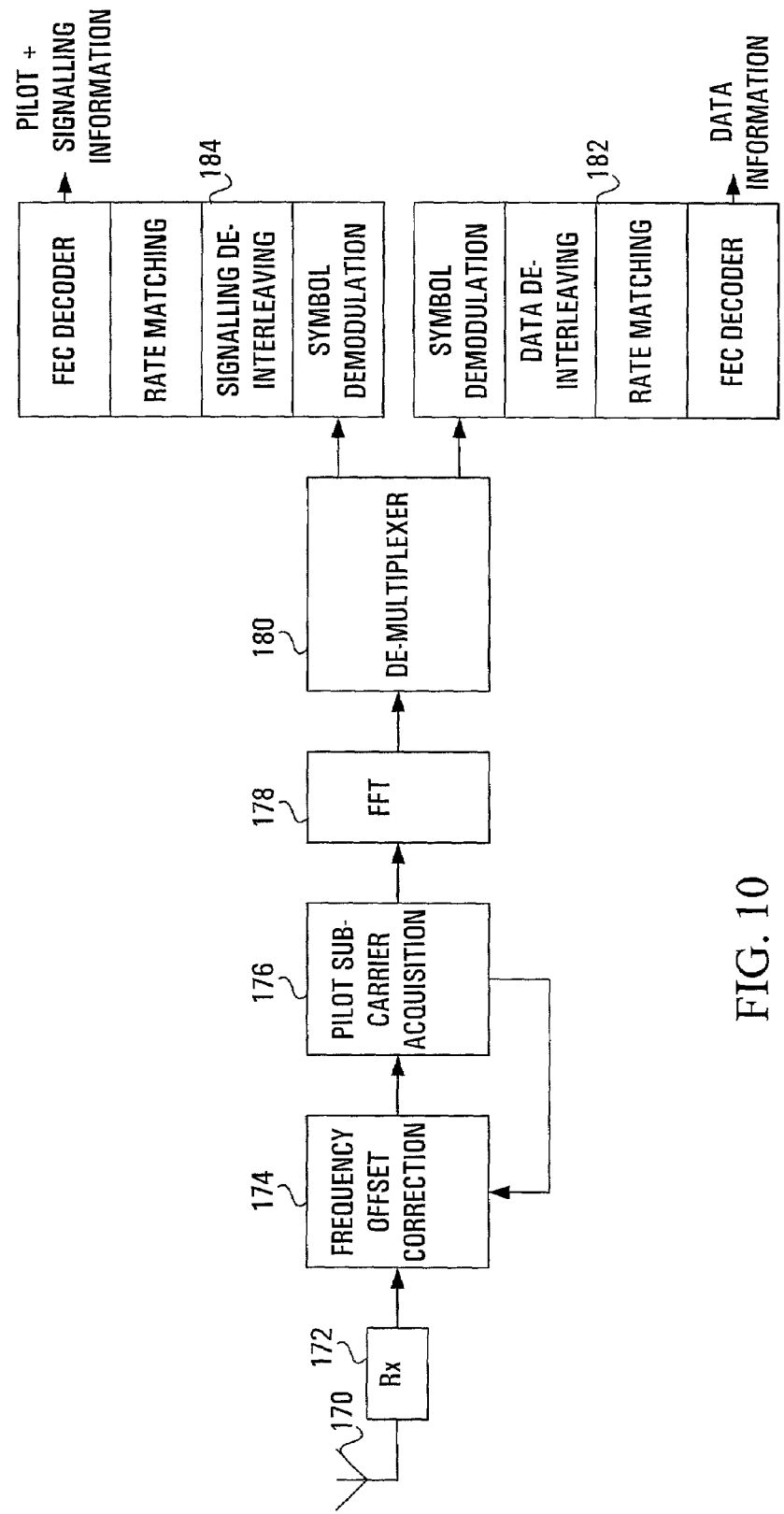
FIG. 10 is a block diagram of a mobile terminal that could be utilized within the OFDM radio systems illustrated in FIG. 1, 5 or 8.

FIG. 10 is a block diagram of a mobile terminal that could be utilized within the OFDM systems illustrated in any one of FIGS. 1, 5 and 7. As depicted, the mobile terminal comprises an antenna 170 coupled in series with a receiver 172, a frequency offset correction block 174, a pilot sub-carrier acquisition block 176, a Fast Fourier Transform (FFT) block 178 and a demulitplexer 180. In this implementation, the demultiplexer 180 is further independently coupled to a data information processor 182 and a service information processor 184. These components function together to receive and process the data, signalling and pilot channels sent from the BTS 50. In FIG. 10, the antenna 170, the receiver 172, the frequency offset correction block 174 and the pilot sub-carrier acquisition block 176 are utilized to initially receive and synchronize the signals sent for the BTS 50. Next, the FFT block 178 operates to transform the time-based data, signalling and pilot signals received from the pilot sub-carrier acquisition block 176 into frequency-based output symbol streams. These frequency-based output symbol streams include a data sub-carrier symbol stream, a signalling sub-carrier symbol stream and a pilot sub-carrier symbol stream which are each forwarded to the demultiplexer 180. The demultiplexer 180 separates the symbol streams such that the data sub-carrier symbol stream is forwarded to the data information processor 182 while the signalling and pilot sub-carrier symbol streams are forwarded to the service information processor 184.

The data information processor 182 performs numerous well-known processing functions on the received data sub-carrier symbol stream in order to output data information contained within the input signals. These well-known processing functions include symbol demodulation, data de-interleaving, rate matching and FEC decoding. Although all of these functions are shown in a particular order in FIG. 10, this should not limit the scope of the present invention. One skilled in the art would understand that these functions could be performed in a different order with a similar resulting output. Further, in alternative embodiments, not all of the functions illustrated, such as FEC decoding, are performed by the processor 182 and/or additional functions not described are also performed. It is noted that the data information being output from the data information processor 182 could be in a number of different formats such as an Internet Protocol (IP) packet format, MPEG coded images, video or another standard data unit format.

The service information processor 184 performs well-known processing functions similar to the data information processor 182. These well-known processing functions in FIG. 10 include symbol demodulation, signalling de-interleaving, rate matching and FEC decoding. It should be understood, similar to that described above for the data information processor 182, that the service information processor 184 could perform the functions in a different order than illustrated in FIG. 10, might not perform all of these functions and/or could perform additional functions not described. Yet further, it should be understood that the service information processor could be divided into at least two processors, one for processing the signalling sub-carrier symbol stream and one for processing the pilot sub-carrier symbol stream. If two or more pilot signals using the same frequency carriers are received at the target mobile terminal, techniques such as matched filtering or correlation may be used to select the desired signal.

Although illustrated and described as two separate and distinct processors 182, 184, it should be understood that the common algorithms performed within these processors could be shared. Further, these processors 182, 184 could be implemented within a single component or within a plurality of separate components.

There is a modification from traditional mobile terminals that would be implemented within preferable implementations of the mobile terminals of the present invention. In preferable implementations of the mobile terminals of the present invention, a monitor device (not shown), coupled to the outputs of the data information processor 182 and the service information processor 184, determines what information is being received at the mobile terminal at any particular time. This monitor determines if only service information is being received, thus indicating that the particular mobile terminal is outside the data traffic beam but within the service beam; if only data traffic information is being received, thus indicating that the particular mobile terminal is inside the data traffic beam but outside the service beam; and if both data traffic information and service information is being received, thus indicating that the particular mobile terminal is inside both the data traffic and service beams. The monitor, after determining what information is being received at the mobile terminal, in this particular implementation, then directs the processing of the received data traffic and service information as required.

It should be noted that although the mobile terminal is illustrated in a single receiver structure within FIG. 10, it should be recognized that it could be possible to implement the terminal with separate receiver structures for the data traffic beam and the service beam. This technique would have the additional disadvantages of significantly additional costs due to additional components.

One modification that is required within some embodiments of the present invention is the introduction of pilot carriers within a data traffic beam as described previously. If precise channel estimations are required for the data channels, a separate data beam pilot signal is required since the transmission of the standard pilot signals via the service beam may not be accurate for the data traffic beam. In one particularly preferable embodiment of the present invention, the pilot signals within the standard pilot channels of the service beam are utilized by the target mobile terminal to generate a broad estimation and synchronization while the data traffic pilots within the data traffic beam are utilized by the target mobile terminal to focus in on the synchronization of the data traffic channels and to estimate the radio propagation conditions.

Although not specifically described above it should be noted that the present invention can apply in cases of mobile terminals within an OFDM cell as well as fixed wireless terminals within an OFDM cell. In the case of a fixed access system in which the subscriber terminals are in a relatively fixed locations, such as inside a residence, the beam direction can be fixed for each subscriber. In this case, the directional beam can be steered towards each subscriber with use of a table of steering values applicable for each subscriber.

Further, although not discussed above, it should be understood that the present invention could be combined with interference cancellation techniques in order to suppress interference between cells on the service beam. That is the mobile terminal, knowing the transmission characteristics of all of the pilots in the area may cancel out those that are interfering with the primary signal. It is also possible to synchronize the service beam (i.e. the timing of their use within the sectors) to minimize the interference between cells to enable efficient frequency reuse.

Yet further, although the embodiments of the present invention were specifically described above for a system in which the BTS transmits a data traffic beam and a service beam to the mobile terminals, it should be recognized that there could be alternative divisions of the transmission beams. For instance, either one of the service and data traffic beams could be subdivided into additional beams. For example, the data traffic beam could be divided between audio traffic and traditional data traffic or could be divided between audio and video traffic. As discussed previously, one possible division of the service beam is to divide the pilot channels and the signalling channels into separate beams. Additionally, the signalling channels could be further subdivided.

Although the present invention has been described herein above specifically for OFDM systems, it should be recognized that direct radio energy (beam) systems that might be developed in the future that have similar characteristics might also benefit from the implementation of the present invention.

Persons skilled in the art will appreciate that there are yet more alternative implementations and modifications possible for implementing the present invention, and that the above implementations are only illustrations of certain embodiments of the invention. The scope of the invention, therefore, is only to be limited by the claims appended hereto.

We claim:

1. An Orthogonal Frequency Division Multiplexed (OFDM) Base Transceiver Station (BTS) arranged to communicate with a plurality of mobile terminals within a coverage area including at least one target mobile terminal, the BTS comprising:
   a processing apparatus that operates to receive and process service and data traffic information; and
   a transmission apparatus that operates to receive the processed service and data traffic information, to transmit the processed service information on a first set of carriers to the mobile terminals within the coverage area with at least one first transmission beam and to transmit the processed data traffic information on a second set of carriers to the target mobile terminal on at least one second transmission beam, the second transmission beam being a directional transmission beam.

2. An OFDM BTS according to claim 1, wherein the service information comprises pilot information and signalling information.

3. An OFDM BTS according to claim 1, wherein the data traffic information comprises data traffic pilot information.

4. An OFDM BTS according to claim 1, wherein the first transmission beam is sufficiently broad for each of the mobile terminals within the coverage area to receive the processed service information.

5. An OFDM BTS according to claim 4, wherein the transmission apparatus comprises at least one first transmission beam output path, the first transmission beam output path comprising a transmitter coupled to the processing apparatus and an antenna coupled to the transmitter; and
   wherein the first transmission beam output path receives the processed service information from the processing apparatus and operates to generate the first transmission beam.

6. An OFDM BTS according to claim 5, wherein the transmission apparatus comprises a plurality of first transmission beam output paths, each of the first transmission beam output paths comprising a transmitter coupled to the processing apparatus and a directional antenna coupled to its respective transmitter; and
   wherein each of the first transmission beam output paths receives the processed service information from the processing apparatus and operates to generate a portion of the first transmission beam, each of the portions of the first transmission beam being focussed on a portion of the coverage area.

7. An OFDM BTS according to claim 5, wherein the transmission apparatus further comprises a plurality of second transmission beam output paths, each of the second transmission beam output paths comprising a phase adjuster coupled to the processing apparatus and further coupled in series with a transmitter and an antenna; and
   wherein the second transmission beam output paths each receive the processed data traffic information from the processing apparatus and operate together to generate the directional second transmission beam by selectively adjusting their respective phase adjusters.

8. An OFDM BTS according to claim 7, wherein the first transmission beam output path and one of the second transmission beam output paths share a common transmitter and antenna; and
   wherein the shared transmitter receives the processed service information from the processing apparatus and receives phase adjusted data traffic information from the output of the phase adjuster within the particular second transmission beam output path.

9. An OFDM BTS according to claim 5, wherein the transmission apparatus further comprises a switch coupled to the processing apparatus and a plurality of second transmission beam output paths coupled to the switch, each of the second transmission beam output paths comprising a transmitter coupled to the switch and a directional antenna coupled to its corresponding transmitter; and
   wherein the switch receives the processed data traffic information from the processing apparatus and selectively forwards the processed data traffic information to a set of the second transmission beam output paths to generate the directional second transmission beam.

10. An OFDM BTS according to claim 9, wherein the set of the second transmission beam output paths to generate the directional second transmission beam comprises one second transmission beam output path.

11. An OFDM BTS according to claim 5, wherein the transmission apparatus further comprises a second transmission beam transmitter coupled to the processing apparatus, a switch coupled to the second transmission beam transmitter and a plurality of second transmission beam directional antennas coupled to the switch; and
   wherein the switch receives the processed data traffic information from the second transmission beam transmitter and selectively forwards the processed data traffic information to a set of the second transmission beam directional antennas to generate the directional second transmission beam.

12. An OFDM BTS according to claim 11, wherein the set of the second transmission beam directional antennas to generate the directional second transmission beam comprises one second transmission beam directional antenna.

13. An OFDM BTS according to claim 1, wherein the first transmission beam is a directional transmission beam; and
   wherein the BTS is operable to modify the direction of focus of the directional first transmission beam in order for each of the mobile terminals within the coverage area to receive the processed service information.

14. An OFDM BTS according to claim 13, wherein the BTS modifies the direction of focus of the directional first transmission beam such that each of the mobile terminals within the coverage area is focussed by the directional first transmission beam for a corresponding time period in a repetitive fashion.

15. An OFDM BTS according to claim 13, wherein the transmission apparatus comprises a plurality of first transmission beam output paths, each of the first transmission beam output paths comprising a phase adjuster coupled to the processing apparatus and further coupled in series with a transmitter and an antenna; and wherein the first transmission beam output paths each receive the processed service information from the processing apparatus and operate together to generate the directional first transmission beam by selectively adjusting their respective phase adjusters.

16. An OFDM BTS according to claim 15, wherein the transmission apparatus further comprises a plurality of second transmission beam output paths, each of the second transmission beam output paths comprising a phase adjuster coupled to the processing apparatus and further coupled in series with a transmitter and an antenna; and wherein the second transmission beam output paths each receive the processed data traffic information from the processing apparatus and operate together to generate the directional second transmission beam by selectively adjusting their respective phase adjusters.

17. An OFDM BTS according to claim 16, wherein at least one of the first transmission beam output paths and at least one of the second transmission beam output paths share a common transmitter and antenna; and wherein the shared transmitter operates to receive phase adjusted service information from the output of the phase adjuster within the at least one first transmission beam output path and to receive phase adjusted data traffic information from the output of the phase adjuster within the at least one second transmission beam output path.

18. An OFDM BTS according to claim 13, wherein the transmission apparatus comprises a plurality of output paths, each output path comprising a first transmission beam phase adjuster coupled to the processing apparatus, a second transmission beam phase adjuster coupled to the processing apparatus, a transmitter coupled to both its respective first and second phase adjusters and an antenna coupled to its respective transmitter;

wherein the output paths each receive the processed service information from the processing apparatus at their respective first transmission beam phase adjusters and the output paths operate together to generate the directional first transmission beam by selectively adjusting their respective first transmission beam phase adjusters; and wherein the output paths each receive the processed data traffic information from the processing apparatus at their respective second transmission beam phase adjusters and the output paths operate together to generate the directional second transmission beam by selectively adjusting their respective second transmission beam phase adjusters.

19. An QFDM BTS according to claim 13, wherein the transmission apparatus comprises a first transmission beam switch coupled to the processing apparatus and a plurality of first transmission beam output paths coupled to the first transmission beam switch, each of the first transmission beam output paths comprising a transmitter coupled to the first transmission beam switch and a directional antenna coupled to its corresponding transmitter; and wherein the first transmission beam switch receives the processed service information from the processing apparatus and selectively forwards the processed service information to a set of the first transmission beam output paths to generate the directional first transmission beam.

20. An OFDM BTS according to claim 19, wherein the transmission apparatus further comprises a second transmission beam switch coupled to the processing apparatus and a plurality of second transmission beam output paths coupled to the second transmission beam switch, each of the second transmission beam output paths comprising a transmitter coupled to the second transmission beam switch and a directional antenna coupled to its corresponding transmitter; and wherein the second transmission beam switch receives the processed data traffic information from the processing apparatus and selectively forwards the processed data traffic information to a set of the second transmission beam output paths to generate the directional second transmission beam.

21. An OFDM BTS according to claim 20, wherein the set of the first transmission beam output paths in which the first transmission beam switch forwards the processed service information comprises one first transmission beam output path and the set of the second transmission beam output paths in which the second transmission beam switch forwards the processed data traffic information comprises one second transmission beam output path.

22. An OFDM BTS according to claim 20, wherein at least one of the first transmission beam output paths and at least one of the second transmission beam output paths share a common transmitter and directional antenna; and wherein the shared transmitter is operable to receive the processed service information from the first transmission beam switch and to receive the processed data traffic information from the second transmission beam switch.

23. An OFDM BTS according to claim 13, wherein the transmission apparatus comprises a first transmission beam switch, a second transmission beam switch and a plurality of output paths, each output path comprising a transmitter coupled to both the first and second transmission beam switches and an antenna coupled to its respective transmitter; and wherein the first transmission beam switch receives the processed service information from the processing apparatus and selectively forwards the processed service information to a set of the output paths to generate the directional first transmission beam and the second transmission beam switch receives the processed data traffic information from the processing apparatus and selectively forwards the processed data traffic information to a set of the output paths to generate the directional second transmission beam.

24. An OFDM BTS according to claim 1 further comprising at least one Peak-Average-Power Ratio (PAPR) block coupled between the processing apparatus and the transmission apparatus, the PAPR block operating to reduce peak power of the processed service and data traffic information.

25. An OFDM BTS according to claim 1, wherein the processing apparatus comprises at least one data traffic and service information processor that operates to receive and process data traffic and service information and an inverse fast fourier transform block coupled between the data traffic and service information processor and the transmission apparatus.

26. An OFDM BTS according to claim 25, wherein the at least one data traffic and service information processor comprises a data traffic information processor, a signalling information processor and a pilot information processor; and wherein each of the data traffic, signalling and pilot information processors perform at least one of modulation mapping, interleaving, rate matching, forward error correction encoding on the data traffic, signalling and pilot information respectively.

27. An OFDM BTS according to claim 1, wherein the transmission apparatus operates to transmit the processed service information with a plurality of transmission beams.

28. An OFDM BTS according to claim 27, wherein the transmission apparatus operates to transmit the processed service information with at least one signalling information transmission beam and at least one pilot information transmission beam.

29. An OFDM BTS according to claim 1, wherein the transmission apparatus operates to transmit the processed data traffic information with a plurality of transmission beams.

30. An OFDM BTS according to claim 29, wherein the transmission apparatus operates to transmit the processed data traffic information with at least one audio traffic information transmission beam and at least one non-audio traffic information transmission beam.

31. An OFDM BTS according to claim 29, wherein the transmission apparatus operates to transmit the processed data traffic information with at least one audio traffic information transmission beam and at least one video traffic information transmission beam.

32. An Orthogonal Frequency Division Multiplexed (OFDM) Base Transceiver Station (BTS) arranged to communicate with a plurality of mobile terminals within a coverage area, the BTS comprising:
a processing apparatus that operates to receive and process service and data traffic information; and
a transmission apparatus that operates to receive the processed service and data traffic information, to transmit the processed service information on a first set of carriers and the processed data traffic information on a second set of carriers using a directional transmission beam;
wherein the BTS is operable to modify the direction of focus of the directional transmission beam in order for each of the mobile terminals within the coverage area to receive the processed service information.

33. An OFDM BTS according to claim 32, wherein the service information comprises pilot information and signalling information.

34. An OFDM BTS according to claim 32, wherein the BTS modifies the direction of focus of the directional transmission beam such that each of the mobile terminals within the coverage area is focussed by the directional beam for a corresponding time period in a repetitive fashion.

35. An OFDM BTS according to claim 32, wherein the transmission apparatus comprises a plurality of output paths, each of the output paths comprising a phase adjuster coupled to the processing apparatus and further coupled in series with a transmitter and an antenna; and
wherein the output paths each receive the processed service and data traffic information from the processing apparatus and operate together to generate the directional transmission beam by selectively adjusting their respective phase adjusters.

36. An OFDM BTS according to claim 32, wherein the transmission apparatus comprises a switch coupled to the processing apparatus and a plurality of output paths coupled to the switch, each of the output paths comprising a transmitter coupled to the switch and a directional antenna coupled to its corresponding transmitter; and
wherein the switch receives the processed service and data traffic information from the processing apparatus and selectively forwards the information to a set of the output paths to generate the directional transmission beam.

37. An OFDM BTS according to claim 36, wherein the set of the output paths in which the switch forwards the information comprises one output path.

38. An OFDM BTS according to claim 32, wherein the transmission apparatus comprises a transmitter coupled to the processing apparatus, a switch coupled to the transmitter and a plurality of directional antennas coupled to the switch; and
wherein the switch receives the processed service and data traffic information from the transmitter and selectively forwards the information to a set of the directional antennas to generate the directional transmission beam.

39. An OFDM BTS according to claim 38, wherein the set of the directional antennas in which the switch forwards the information comprises one directional antenna.

40. An OFDM BTS according to claim 32 further comprising at least one Peak-Average-Power Ratio (PAPR) block coupled between the processing apparatus and the transmission apparatus, the PAPR block operating to reduce peak power of the processed service and data traffic information.

41. An OFDM BTS according to claim 32, wherein the processing apparatus comprises at least one data traffic and service information processor that operates to receive and process data traffic and service information and an inverse fast fourier transform block coupled between the data traffic and service information processor and the transmission apparatus.

42. An OFDM BTS according to claim 41, wherein the at least one data traffic and service information processor comprises a data traffic information processor, a signalling information processor and a pilot information processor; and
wherein each of the data traffic, signalling and pilot information processors perform at least one of modulation mapping, interleaving, rate matching, forward error correction encoding on the data traffic, signalling and pilot information respectively.

43. A radio system comprising an Orthogonal Frequency Division Multiplexed (OFDM) Base Transceiver Station (BTS) and a plurality of mobile terminals within a coverage area of the BTS, at least one of the mobile terminals being a target mobile terminal;
wherein the OFDM BTS is operable to receive service and data traffic information, to transmit the service information on a first set of carriers to the mobile terminals within the coverage area with a first transmission beam and to transmit the data traffic information on a second set of carriers to the target mobile terminal with a second transmission beam, the second transmission beam being a directional transmission beam.

* * * * *

UNITED STATES PATENT AND TRADEMARK OFFICE
CERTIFICATE OF CORRECTION

PATENT NO. : 6,996,418 B2 Page 1 of 1
APPLICATION NO. : 09/842128
DATED : February 7, 2006
INVENTOR(S) : Koon H. Teo et al.

It is certified that error appears in the above-identified patent and that said Letters Patent is hereby corrected as shown below:

In Column 21, line 52, "...QFDM..." should read --...OFDM...--.

Signed and Sealed this

Third Day of October, 2006

JON W. DUDAS
*Director of the United States Patent and Trademark Office*